United States Patent [19]

Pomernacki

[11] 3,896,539
[45] July 29, 1975

[54] METHODS FOR ASSEMBLING WASHER MEMBERS WITH ROTARY FASTENER MEMBERS

[75] Inventor: Henry Pomernacki, Northbrook, Ill.

[73] Assignee: Illinois Tool Works Inc., Chicago, Ill.

[22] Filed: May 25, 1973

[21] Appl. No.: 363,842

Related U.S. Application Data

[62] Division of Ser. No. 88,942, Nov. 12, 1970, Pat. No. 3,750,206.

[52] U.S. Cl. ................................................. 29/430
[51] Int. Cl.[2] ........................................ B23P 19/08
[58] Field of Search...... 29/430, 431, 200 R, 208 R; 10/155 A, 155 R, 162 R, 165, 169

[56] References Cited
UNITED STATES PATENTS

| | | | |
|---|---|---|---|
| 1,958,180 | 5/1934 | Brackett | 10/155 A |
| 2,271,028 | 1/1942 | Olson | 10/155 A |
| 2,333,940 | 11/1943 | Kuehlman | 10/155 A |
| 2,337,667 | 12/1943 | Kuehlman | 10/155 A |
| 2,714,214 | 8/1955 | Stern | 10/155 A |
| 2,792,578 | 5/1957 | Autio | 10/155 A |
| 2,927,333 | 3/1960 | Stern | 10/155 A |
| 3,114,159 | 12/1963 | Yoshikawa | 29/208 R |
| 3,226,744 | 1/1966 | Marechal et al. | 29/208 R |

FOREIGN PATENTS OR APPLICATIONS

| | | | |
|---|---|---|---|
| 549,478 | 11/1957 | Canada | 10/155 A |

Primary Examiner—C. W. Lanham
Assistant Examiner—Dan C. Crane
Attorney, Agent, or Firm—Olson, Trexler, Wolters, Bushnell & Fosse, Ltd.

[57] ABSTRACT

The present invention relates generally to improvements in methods for assembling washer members with rotary fastener members. The machine disclosed herein whereby said methods may be practiced includes a station for cascading an indiscriminately arranged supply of washer members to a rotary disc station for feeding properly oriented washer members along a circular path to an assembly station. Rotary fastener members such as screw blanks are directed from an indiscriminately arranged supply thereof along a different path to said assembly station. The fastener members and washer members are telescopically associated, and directed to a thread rolling station, for swaging the rotary fastener member to secure the telescopically associated fastener members and washer members against axial separation. Washers not accommodated by fastener members at the rotary disc station are conveyed along a predetermined path to said washer cascading station for redelivery to said rotary disc station.

12 Claims, 44 Drawing Figures

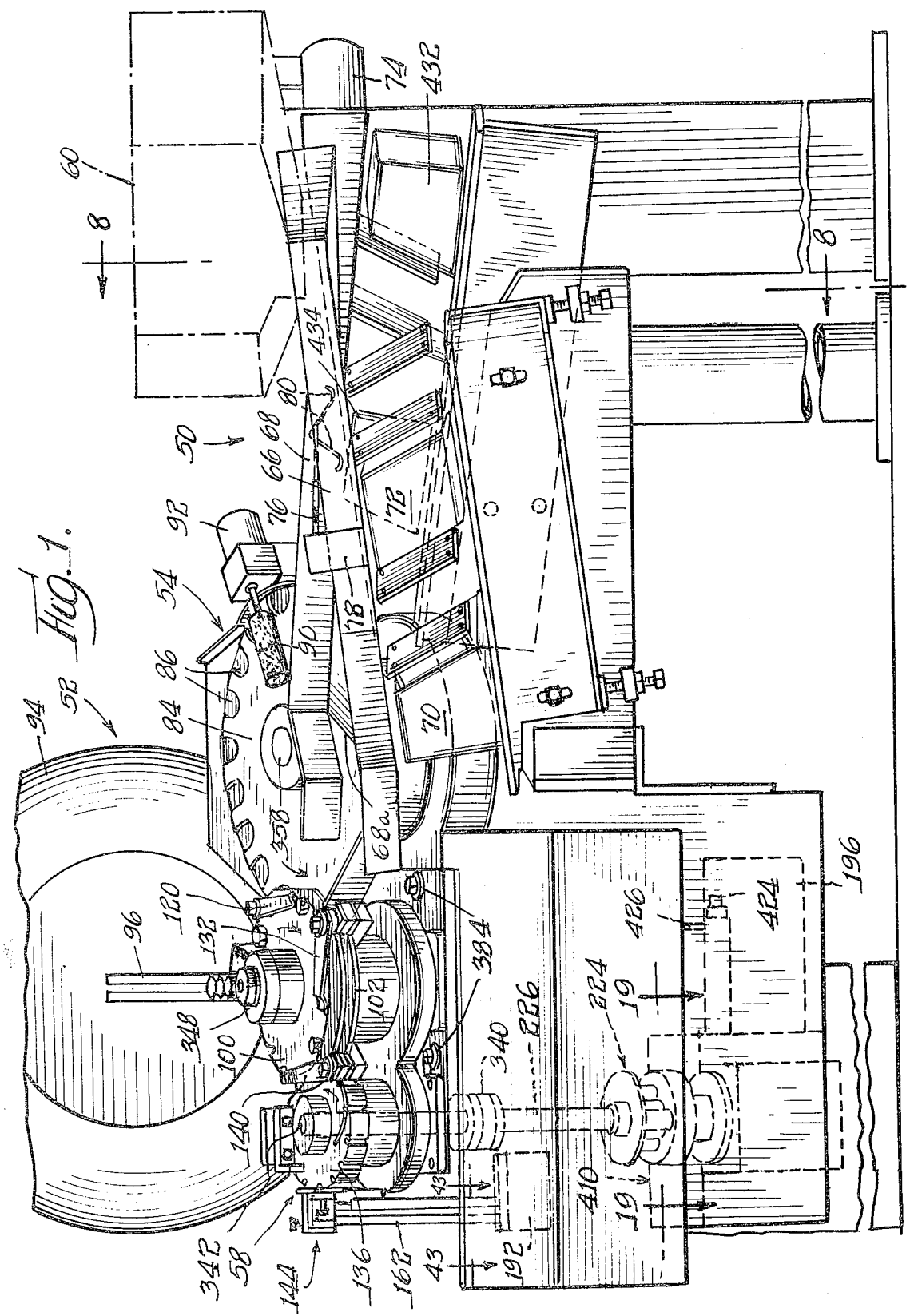

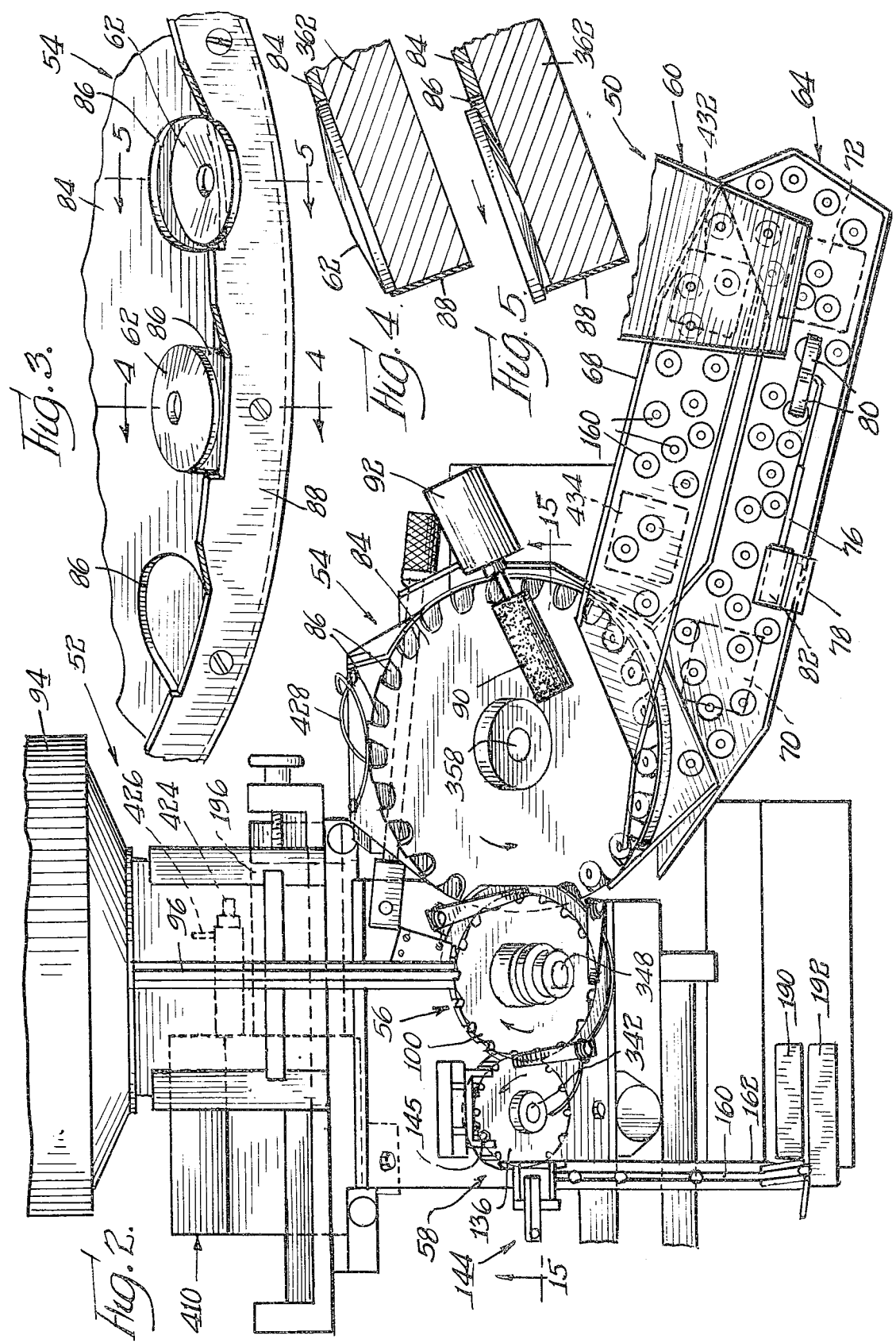

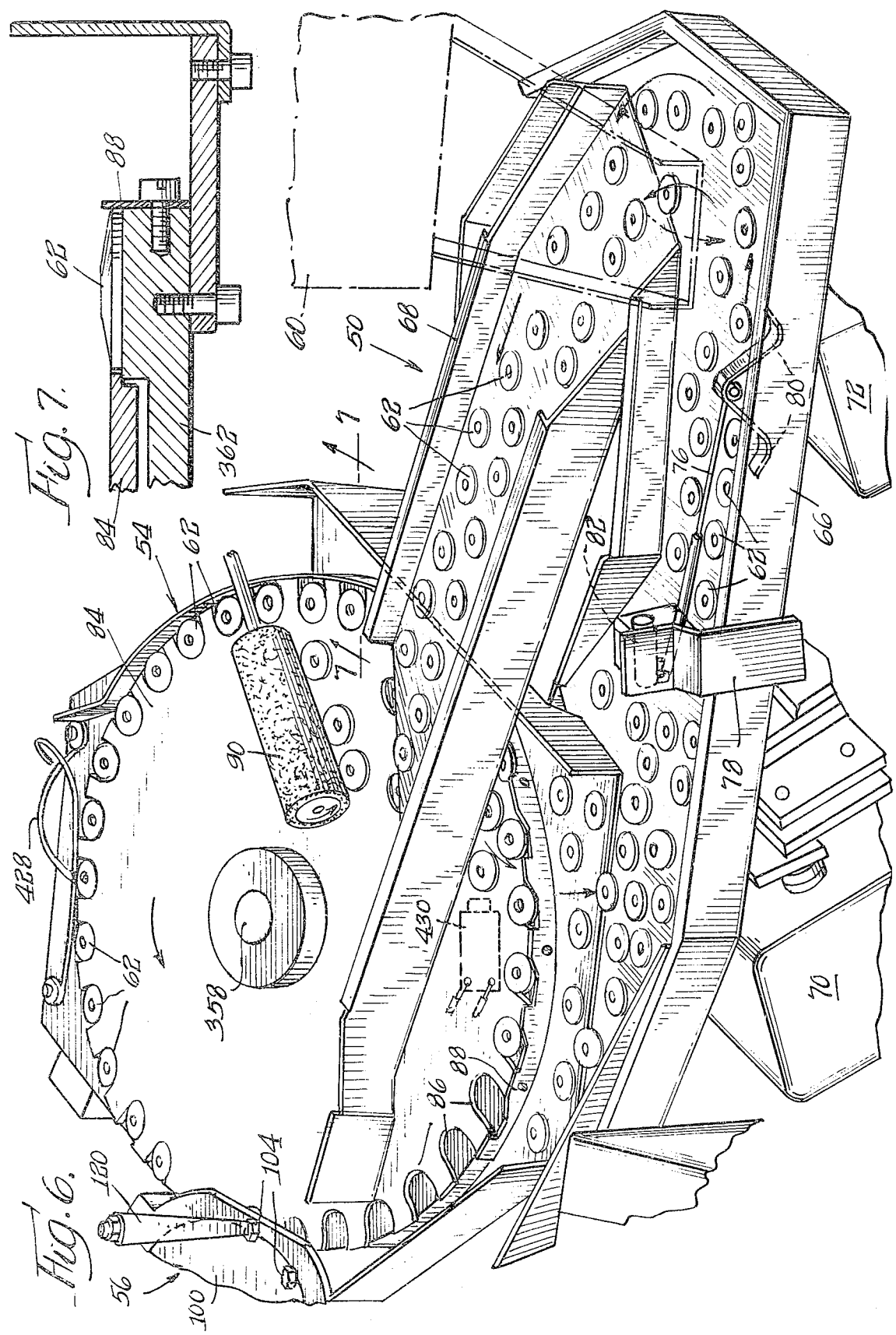

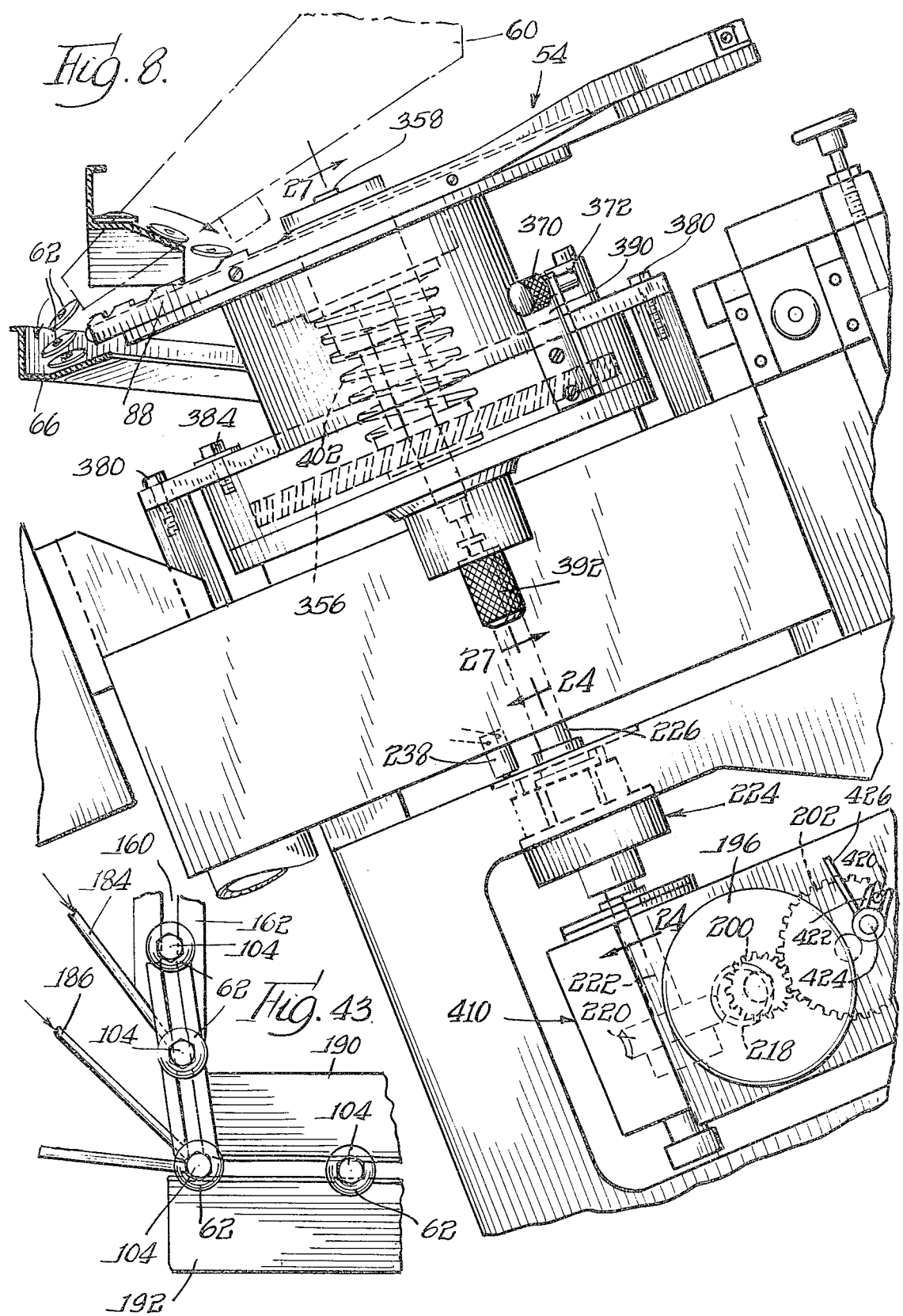

PATENTED JUL 29 1975 3,896,539
SHEET 5

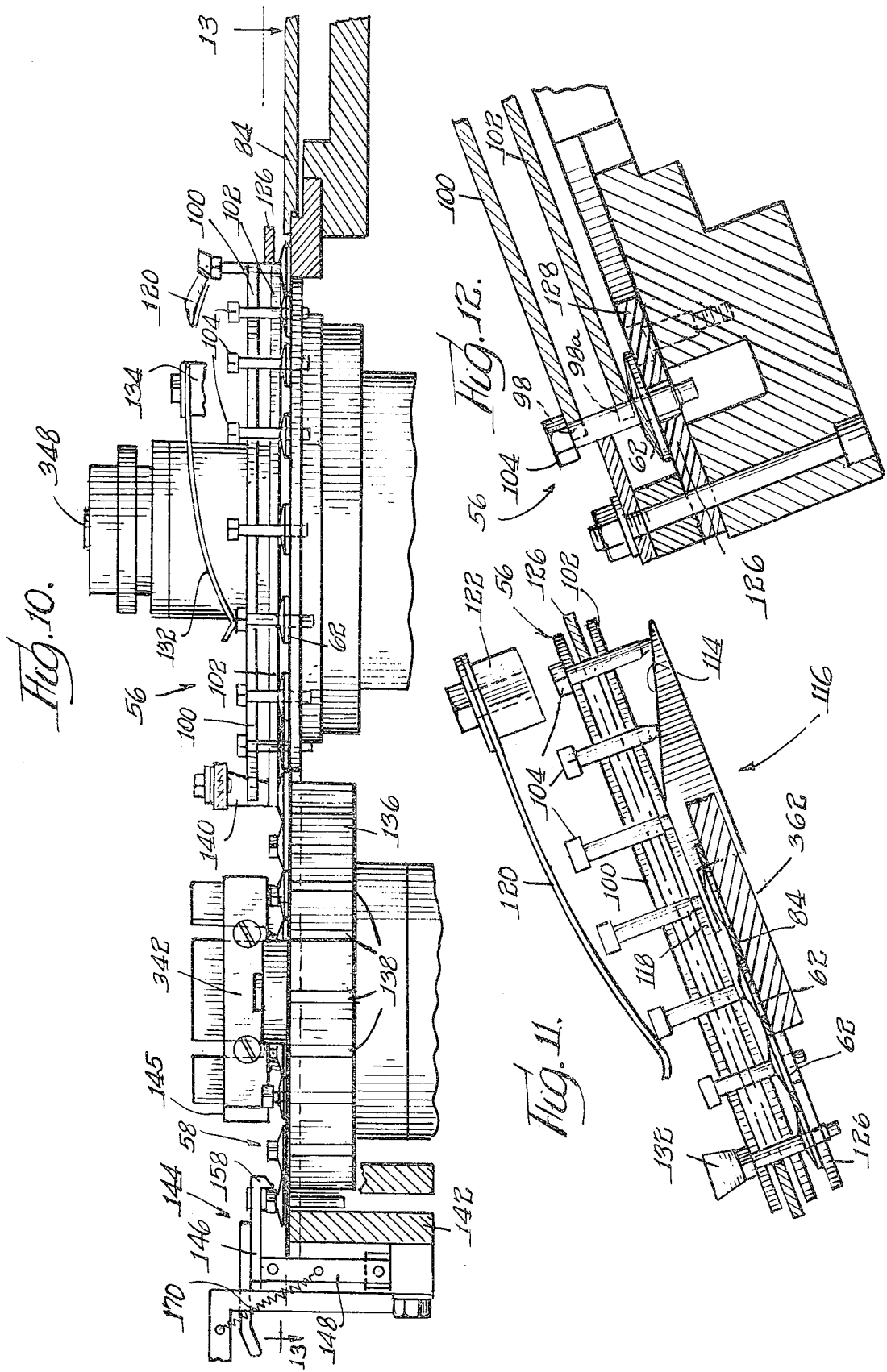

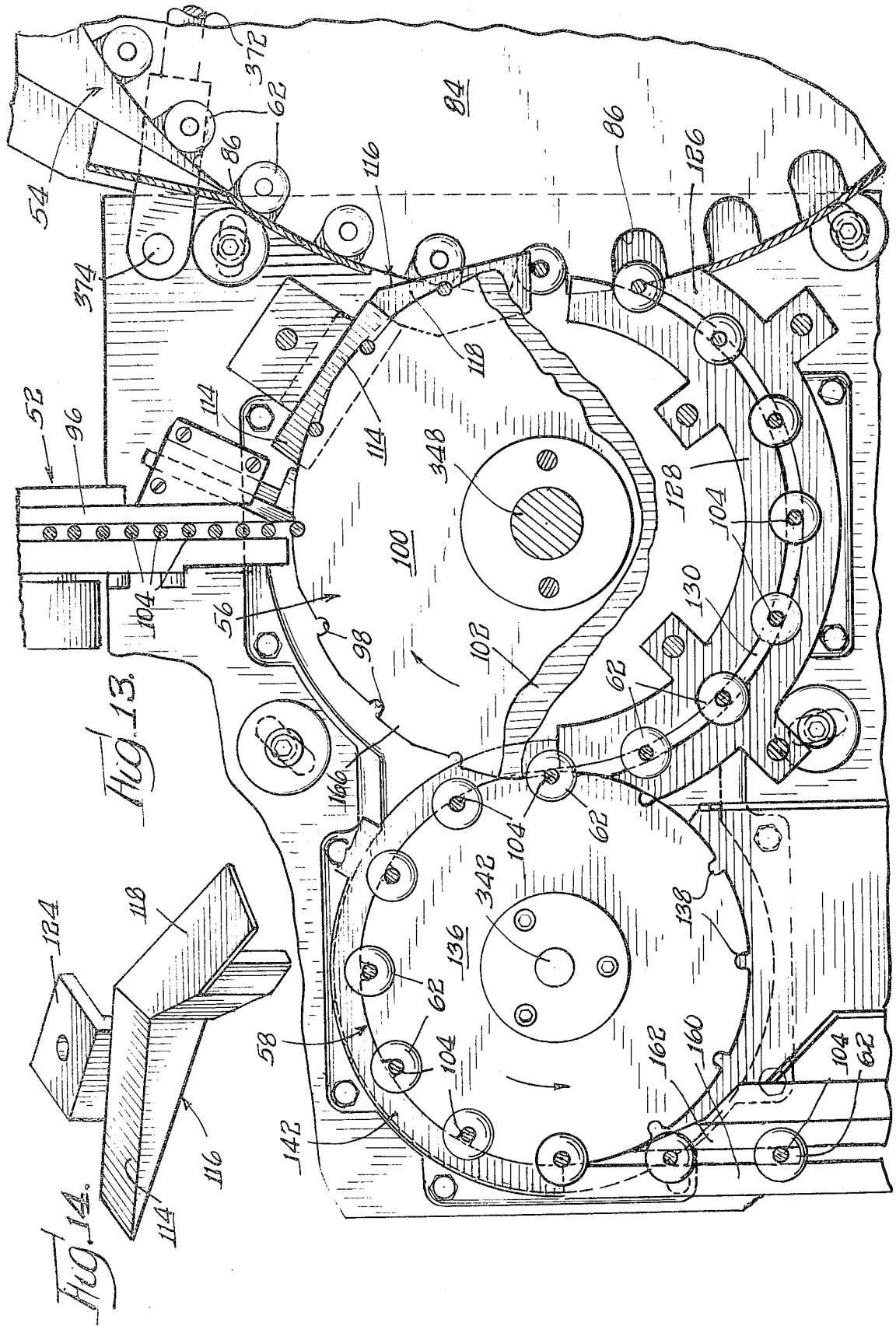

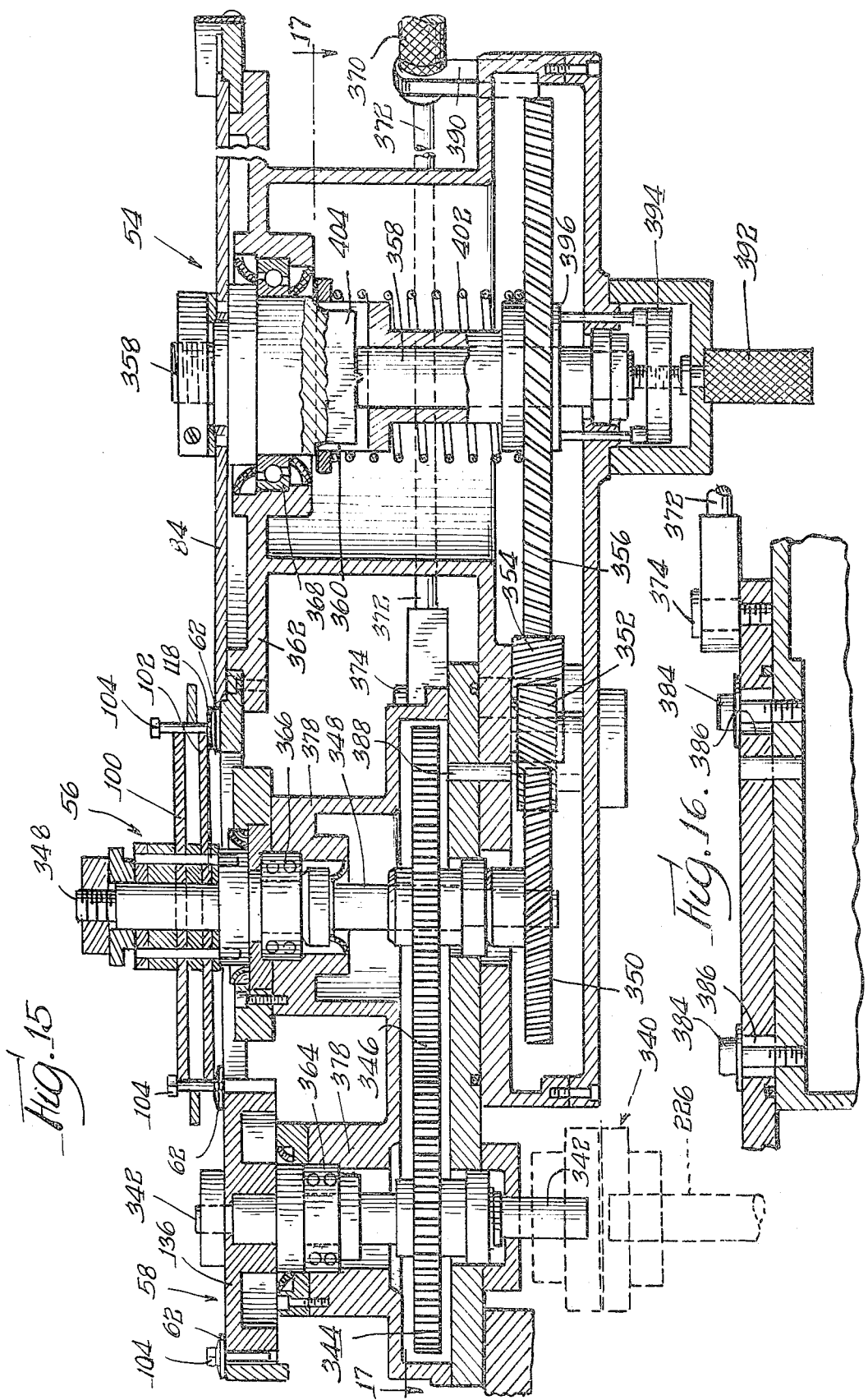

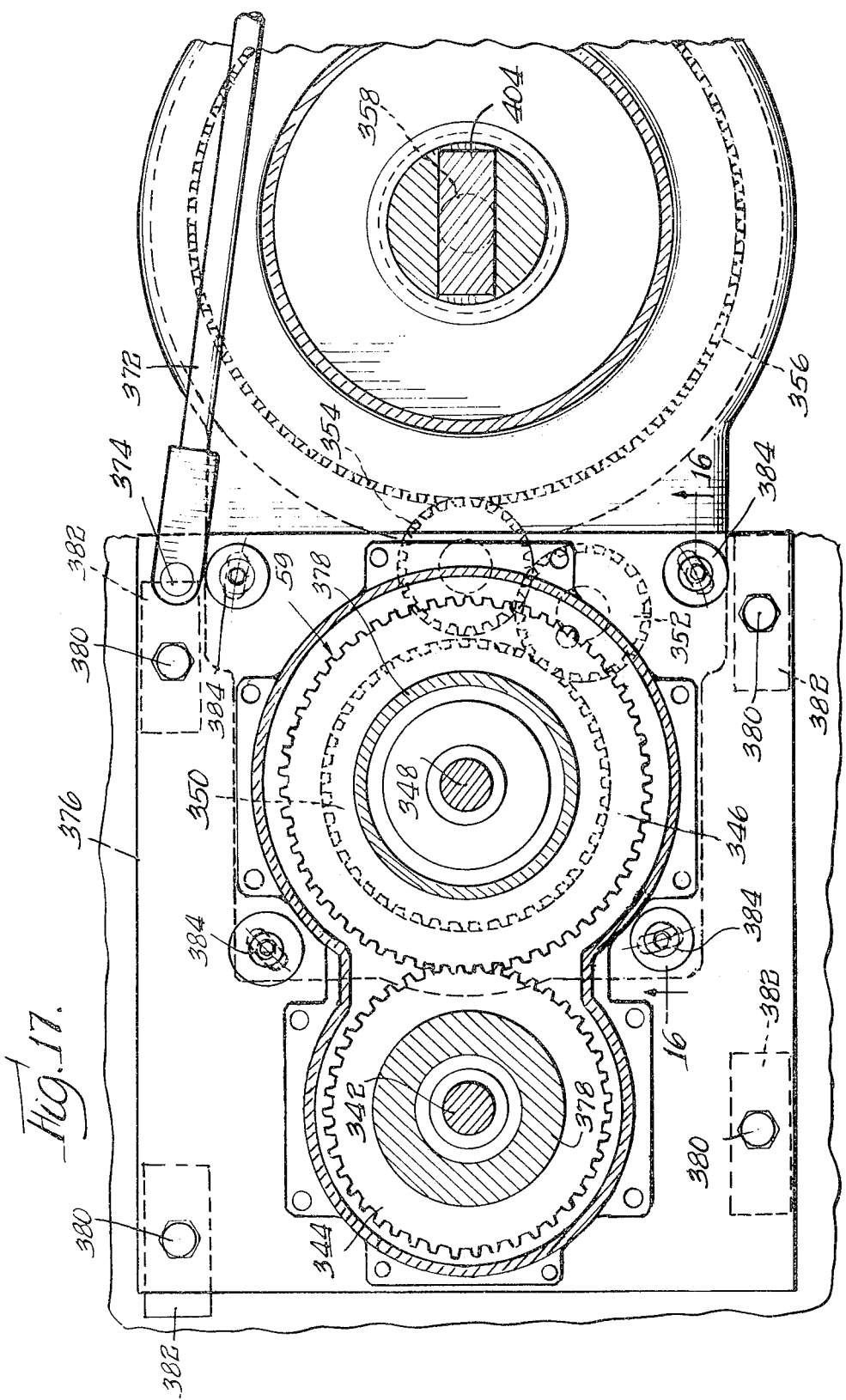

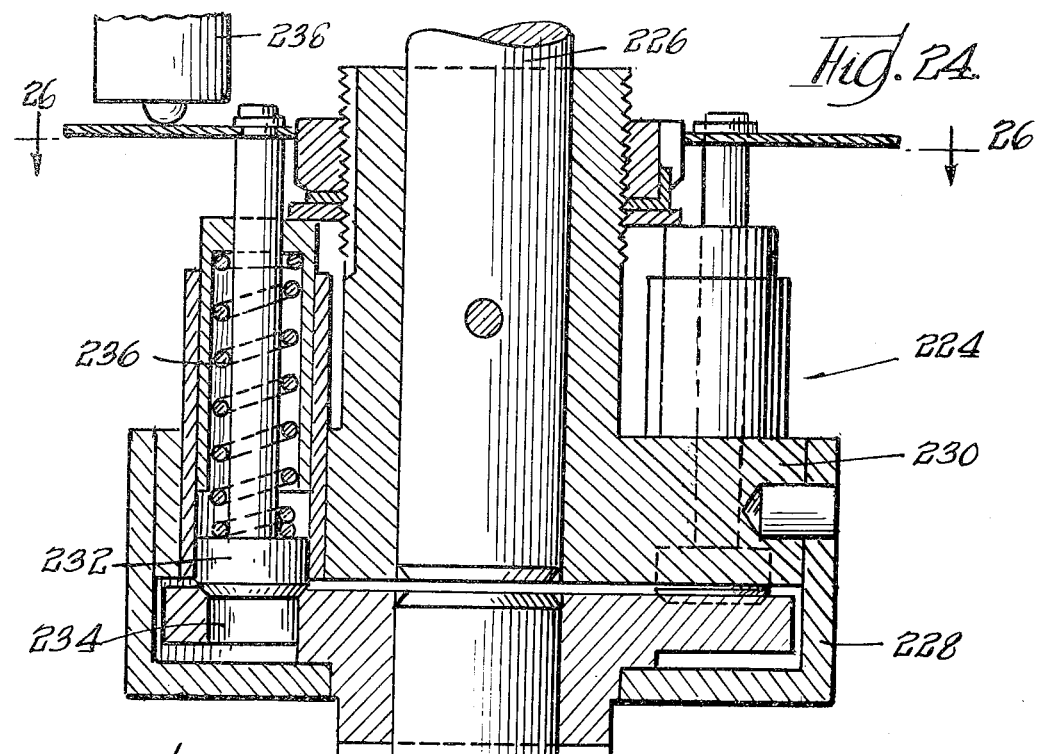
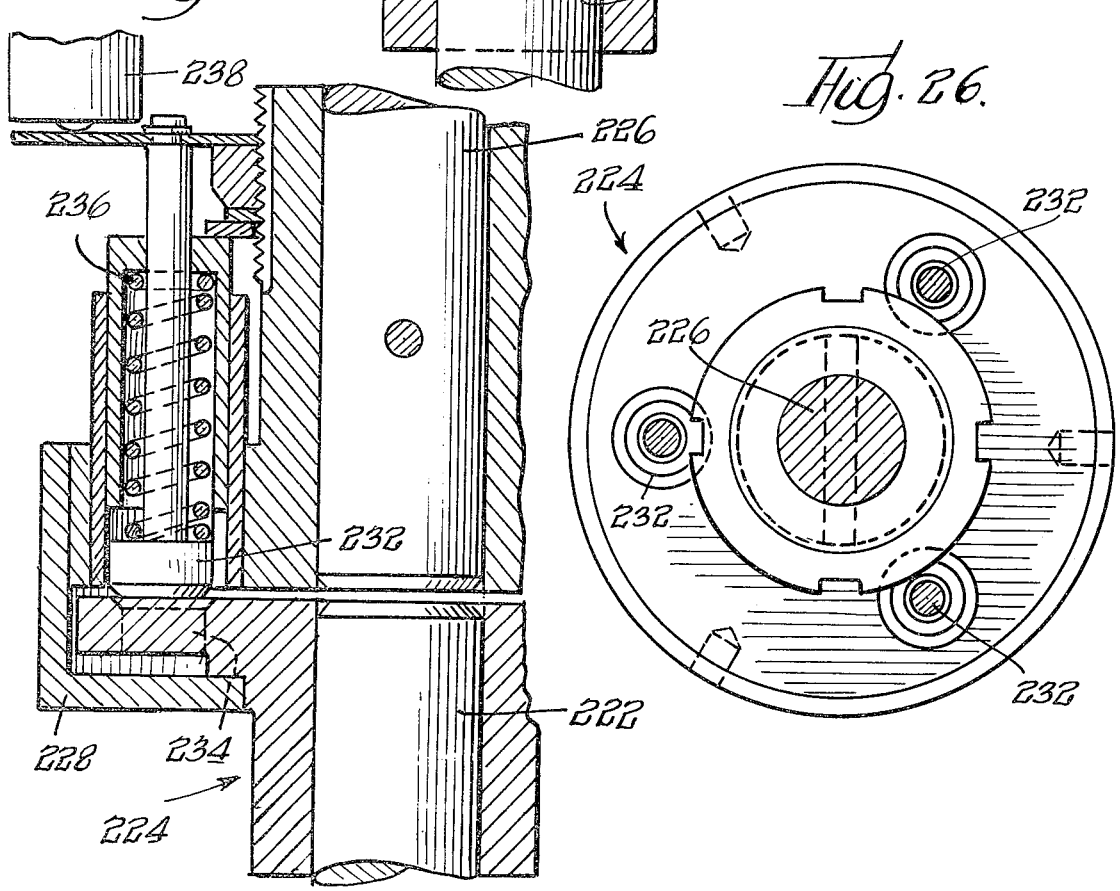

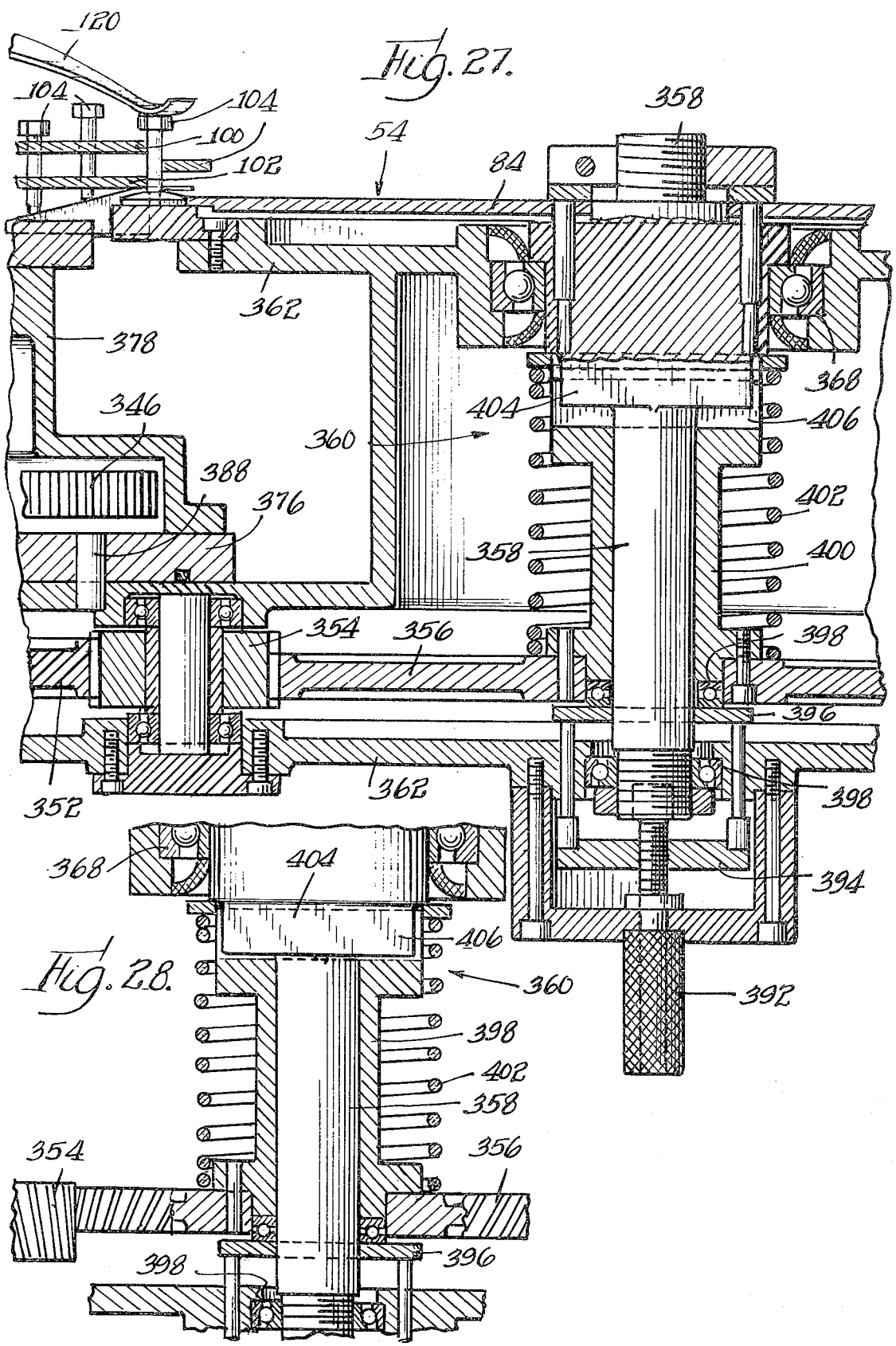

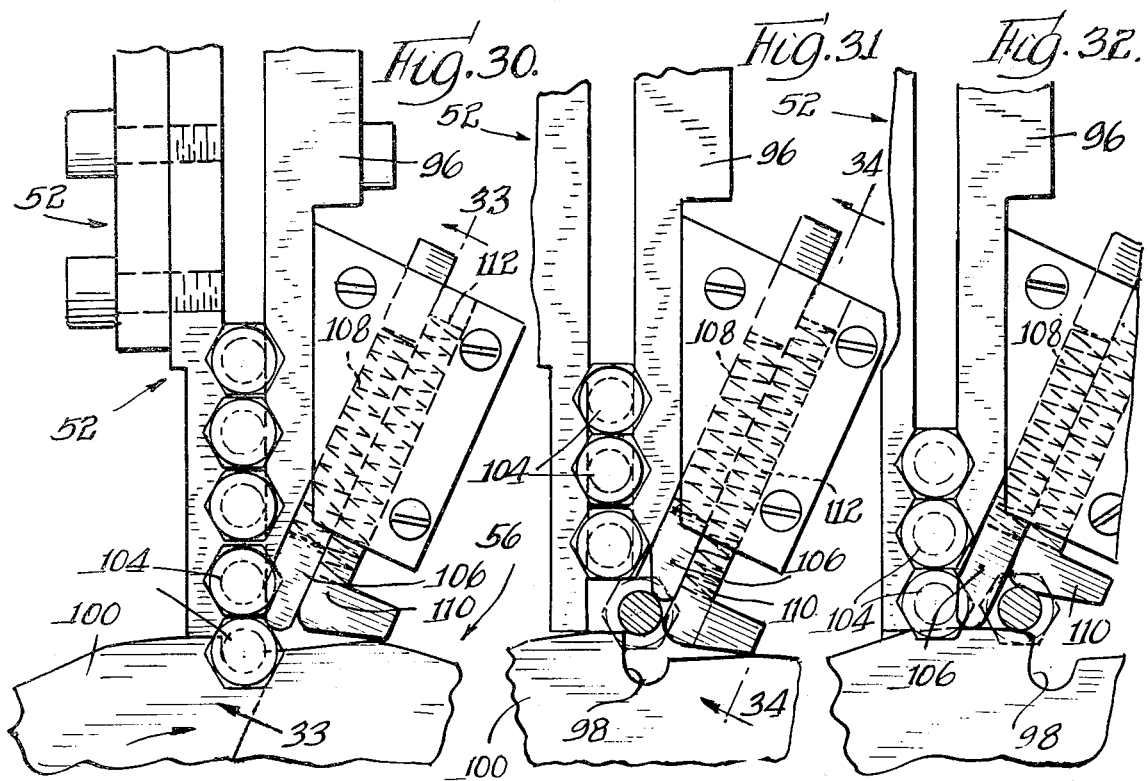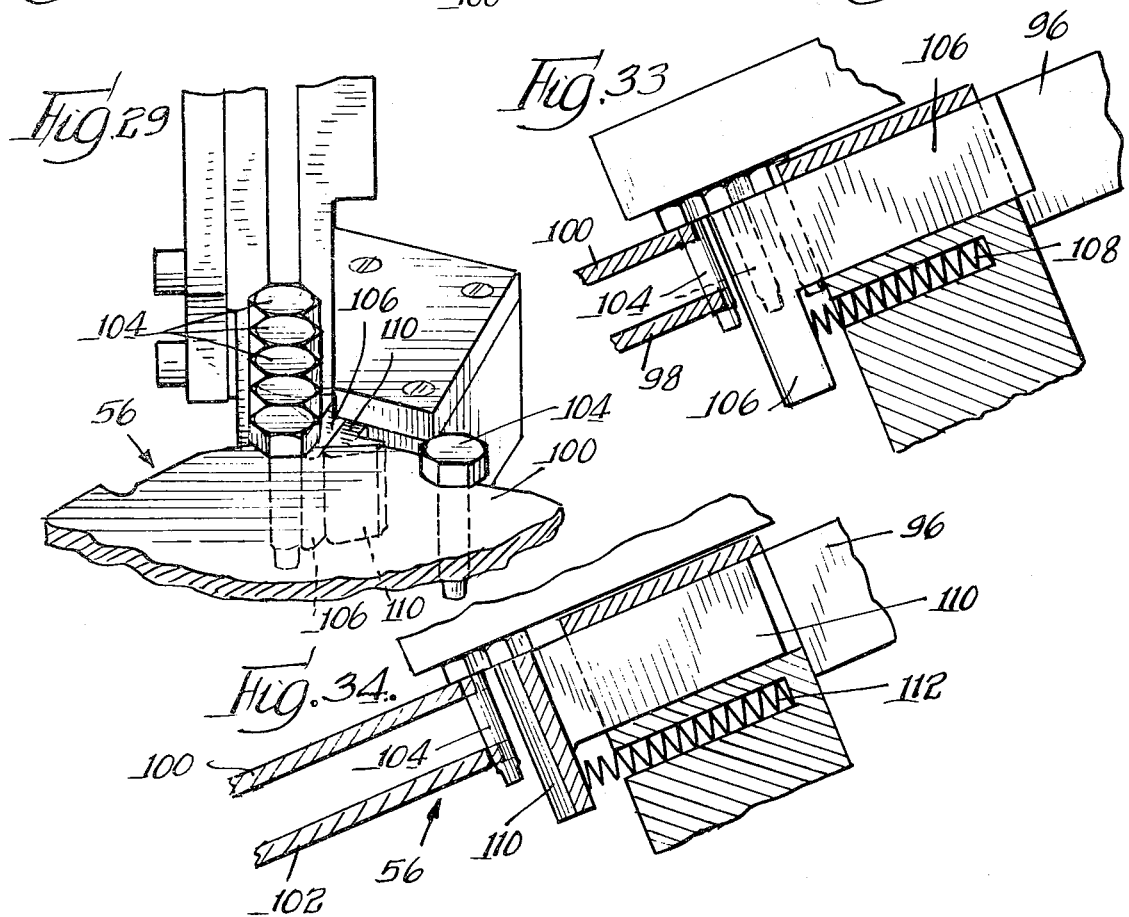

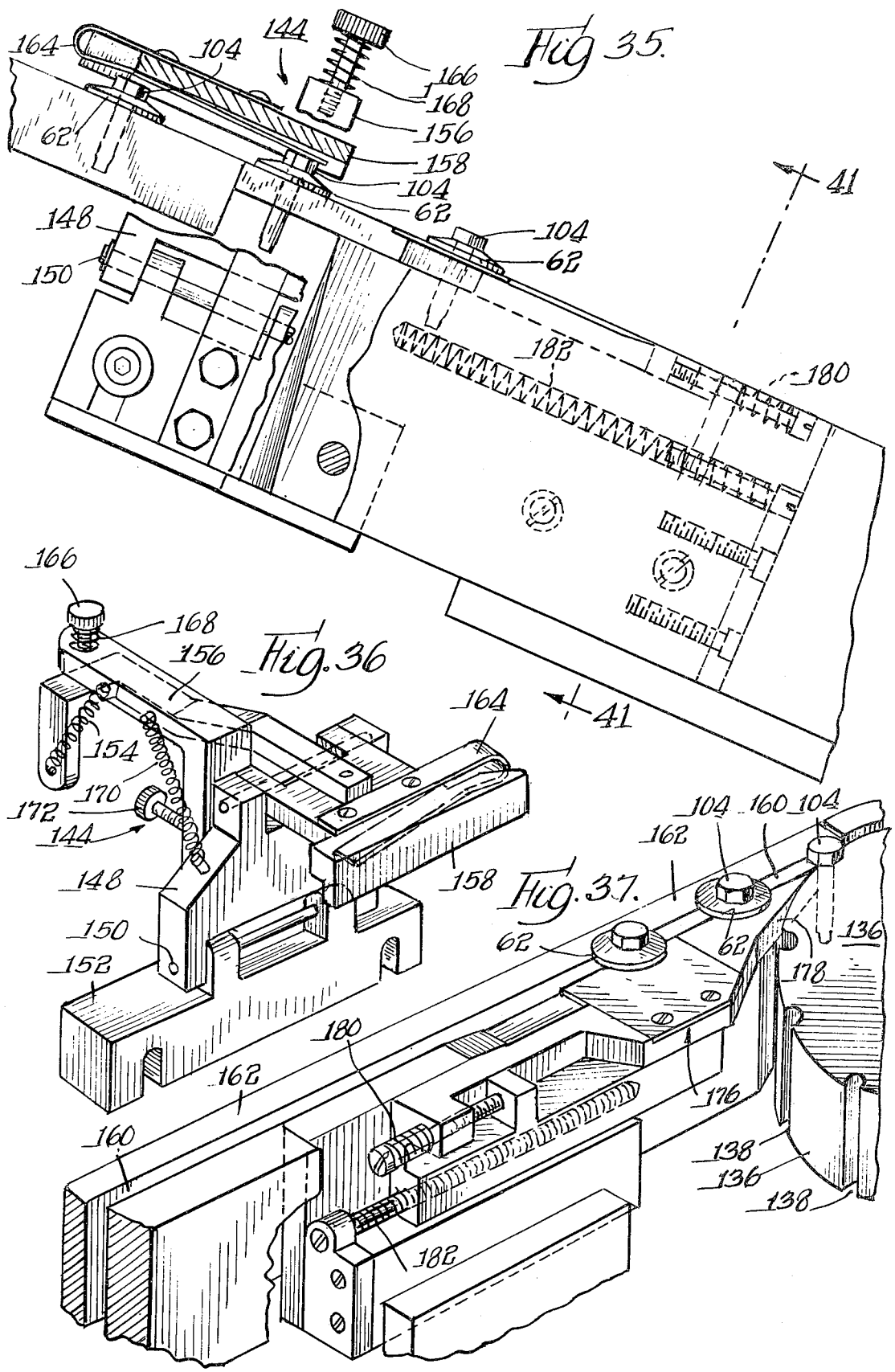

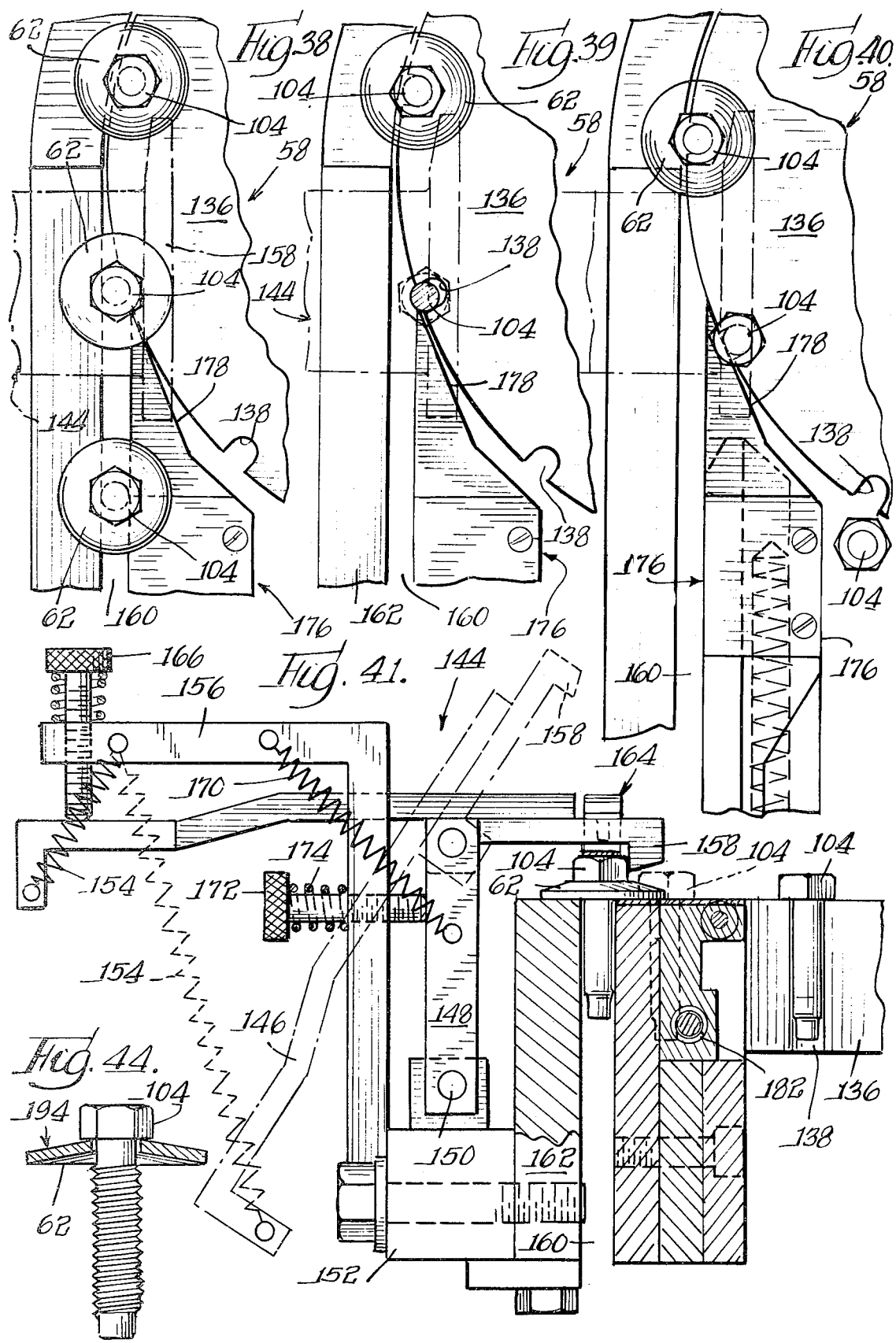

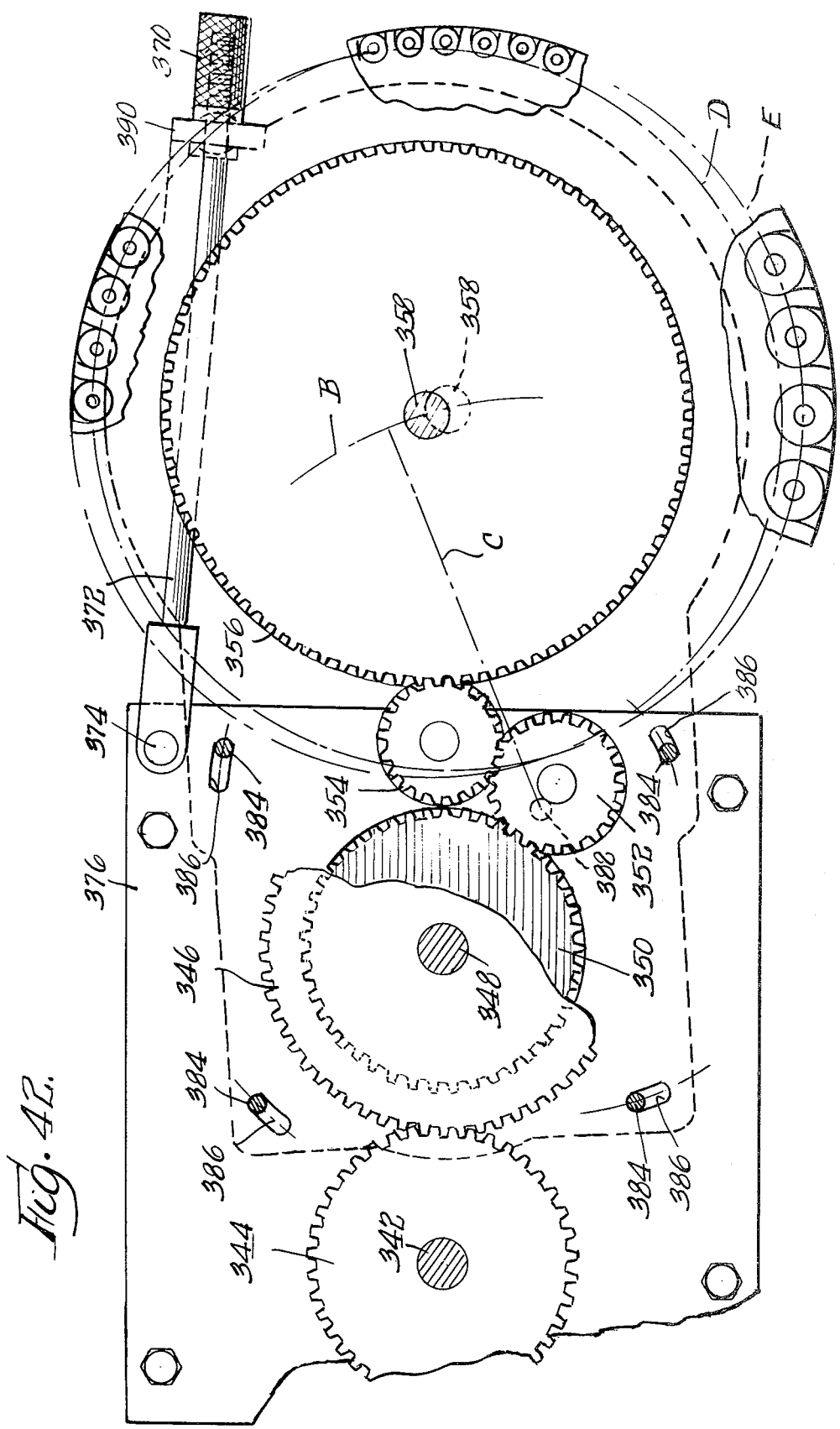

METHODS FOR ASSEMBLING WASHER MEMBERS WITH ROTARY FASTENER MEMBERS

This application is a division of application, Ser. No. 88,942, filed Nov. 12, 1970, now U.S. Pat. No. 3,750,206.

SUMMARY OF THE INVENTION

One of the problems incident to the practice of methods of assembling rotary fastener members and washer members is that of providing an adequate rate of delivery of properly oriented washers to the station at which such washer members are to be telescopically associated with the shank of a rotary fastener member. It is possible to feed washerless screw blanks to a thread roller at relatively high speeds. However, it has not been possible heretofore, to maintain this relatively high speed of delivery to a thread roller of screw blanks having washer members telescopically associated therewith. This is due to a number of factors such as, for example, the inadequate rate at which properly oriented washer members have been fed to the location at which each washer member telescopically receives a rotary fastener shank. Another factor is that the rate of telescopic assembly of the fastener members and washer members and subsequent rate of advancement, has heretofore been inadequate. Conventional reciprocable type thread roller dies are adapted to operate at the rate of at least 400 strokes per minute. Methods heretofore available for telescopically assembling rotary fastener members and washer members have not had the capacity to even approach such speeds of operation.

It is, therefore, an important object of the present invention to provide methods whereby rotary fastener members and washer members may be telescopically preassembled and subsequently advanced at speeds commensurate with the speed of available reciprocable thread roller dies. The rotary threaded fastener members and washer members thus assembled are commonly referred to as fastener units. In fact, the present invention contemplates the production of fastener units at speeds well in excess of 400 per minute.

More specifically, the invention contemplates improved methods whereby washer members may be cascaded or delivered to a washer feeding station in such a manner as to materially increase the speed of producing fastener units.

A further object of the present invention is to provide highly efficient methods of the type set forth above, which will assure complete telescopic association of the rotary fastener members and washer members at a relatively rapid rate as these parts are advanced toward the swaging or thread rolling station.

Another object of the present invention is to provide unique methods as set forth above, for assembling rotary fastener members and washer members of varied sizes.

To assure an adequate supply of washer members to be cascaded to the rotary washer feeding station, the present invention contemplates a novel arrangement for receiving the excess of cascaded washer members and recirculating said excess members to the cascading station for redelivery to the feeding station.

BRIEF DESCRIPTION OF THE DRAWINGS

The foregoing and other objects and advantages will be more apparent from the following detailed description when considered in connection with the accompanying drawings wherein:

FIG. 1 is a front elevational view of a machine for assembling rotary fastener members and washer members which is representative of one embodiment of the present invention;

FIG. 2 is a plan view of the machine shown in FIG. 1;

FIG. 3 is an enlarged fragmentary perspective view of a marginal portion of the washer conveying disc, disclosing one properly oriented washer member registered with a pocket and another improperly oriented washer member being ejected from a pocket;

FIG. 4 is a fragmentary, vertical, sectional view taken substantially along the line 4—4 of FIG. 3;

FIG. 5 is a fragmentary, vertical, sectional view taken substantially along the line 5—5 of FIG. 3, disclosing the improperly oriented washer member being discharged from a pocket;

FIG. 6 is an enlarged perspective view of the washer feeding disc and the channel arrangement for receiving unaccommodated washer members from said disc and recirculating said washer members to the cascading location;

FIG. 7 is a fragmentary detailed sectional view taken substantially along the line 7—7 of FIG. 6, disclosing the manner in which a properly oriented washer member is accommodated by one of the disc pockets;

FIG. 8 is an elevational view of the washer feeding disc mechanism and associated structure as viewed along the line 8—8 of FIG. 1;

FIG. 10 is a fragmentary side elevational view of the rotary feeding members of FIG. 9, said view being taken substantially along the line 10—10 of FIG. 9;

FIG. 11 is a side elevational view of the rotary feeding member adapted to receive telescopically assembled fastener members and washer members from the washer feeding disc, said view being taken substantially along the line 11—11 of FIG. 9;

FIG. 12 is a detailed sectional view of the rotary feeding mechanism shown in FIG. 11, said section being taken substantially along the line 12—12 of FIG. 9;

FIG. 13 is a view similar to FIG. 9, and taken substantially along the line 13—13 of FIG. 10, more clearly to illustrate the structural features of the rotary feeding member which receives aligned fastener members and washer members from the rotary washer feeding disc;

FIG. 14 is a perspective view of the cam device for guiding the lower extremities of the screw members as shown in FIG. 11;

FIG. 15 is a vertical, sectional view taken substantially along the line 15—15 of FIG. 2;

FIG. 16 is a detailed, sectional view taken substantially along the line 16—16 of FIG. 17.

FIG. 17 is a plan sectional view taken substantially along the line 17—17 of FIG. 15, illustrating the gear train arrangement of the driving mechanism;

FIG. 24 is a vertical, sectional view of the overload clutch taken substantially along the line 24—24 of FIG. 8, the clutch being shown in its engaged or driving position;

FIG. 25 is a sectional view similar to FIG. 24, showing the disengaged position of the clutch;

FIG. 26 is a horizontal, sectional view taken substantially along the line 26—26 of FIG. 24;

FIG. 27 is a vertical, sectional view taken substantially along the line 27—27 of FIG. 8, showing the micrometer mechanism for rotatably adjusting the washer feeding disc member;

FIG. 28 is a sectional view similar to FIG. 27, showing the lower helical gear of the micrometer mechanism in an upwardly shifted position;

FIG. 29 is a perspective view of a lower extremity of the screw blank directing guide and a fragmentary portion of the rotary screw feeding member;

FIGS. 30, 31 and 32, are plan views of structures shown in FIG. 29, to illustrate the various shifted positions of the mechanism for properly directing screw blanks from the guide rail or chute to the peripheral recesses in the rotary screw feeding member;

FIG. 33 is a fragmentary sectional view taken substantially along the line 33—33 of FIG. 30;

FIG. 34 is a fragmentary sectional view similar to FIG. 33 taken substantially along the line 34—34 of FIG. 31;

FIG. 35 is a side view partly in section taken substantially along the line 35—35 of FIG. 9, of the mechanism for detecting and rejecting washerless screw blanks;

FIG. 36 is a perspective view of the device shown in FIG. 35;

FIG. 37 is a perspective view of the washerless screw blank directing mechanism as seen from the opposite side of the device as viewed in FIG. 35, more clearly to illustrate the functional and structural characteristics of the shiftable gate device for diverting washerless screw blanks from the path leading to the thread roller;

FIGS. 38, 39 and 40 are successive fragmentary plan views of the washerless screw blank rejecting device to more clearly disclose the manner in which the shiftable gate device of FIG. 37 functions to divert washerless screw blanks from the guiderail leading to the thread roller;

FIG. 41 is a vertical, sectional view taken substantially along the line 41—41 of FIG. 35, disclosing the arrangement of the shiftable arm members for initially detecting washerless screw blanks;

FIG. 42 is a semi-diagrammatic illustration of the gear train of the driving mechanism and the device for obtaining micrometer adjustment of the position of the washer feeding disc axis;

FIG. 43 is a fragmentary plan view of the lower or discharge extremity of the screw blank directing guiderail in association with a pair of conventional reciprocating type die members for forming or swaging thread convolutions upon the periphery of a screw blank; and, FIG. 44 discloses a fastener unit, namely, a preassembled screw and washer of the type which may be produced by following the teachings of the present invention.

DESCRIPTION OF THE PREFERRED EMBODIMENT

Figure 9:
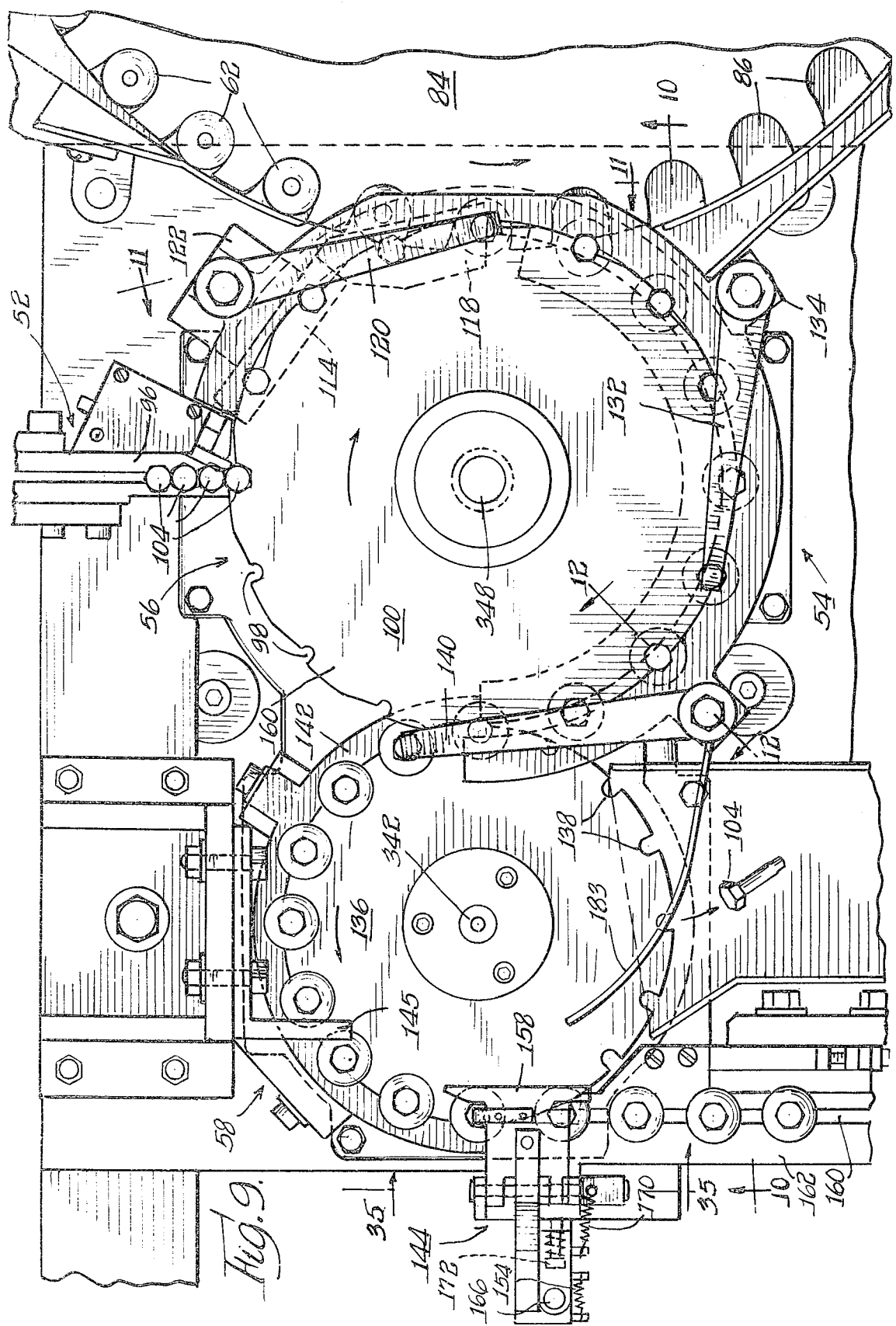
FIG. 9 is an enlarged plan view disclosing the washer feeding disc and the two associated rotary feeding members for advancing telescopically associated fastener members and washer members.
Figure 18:
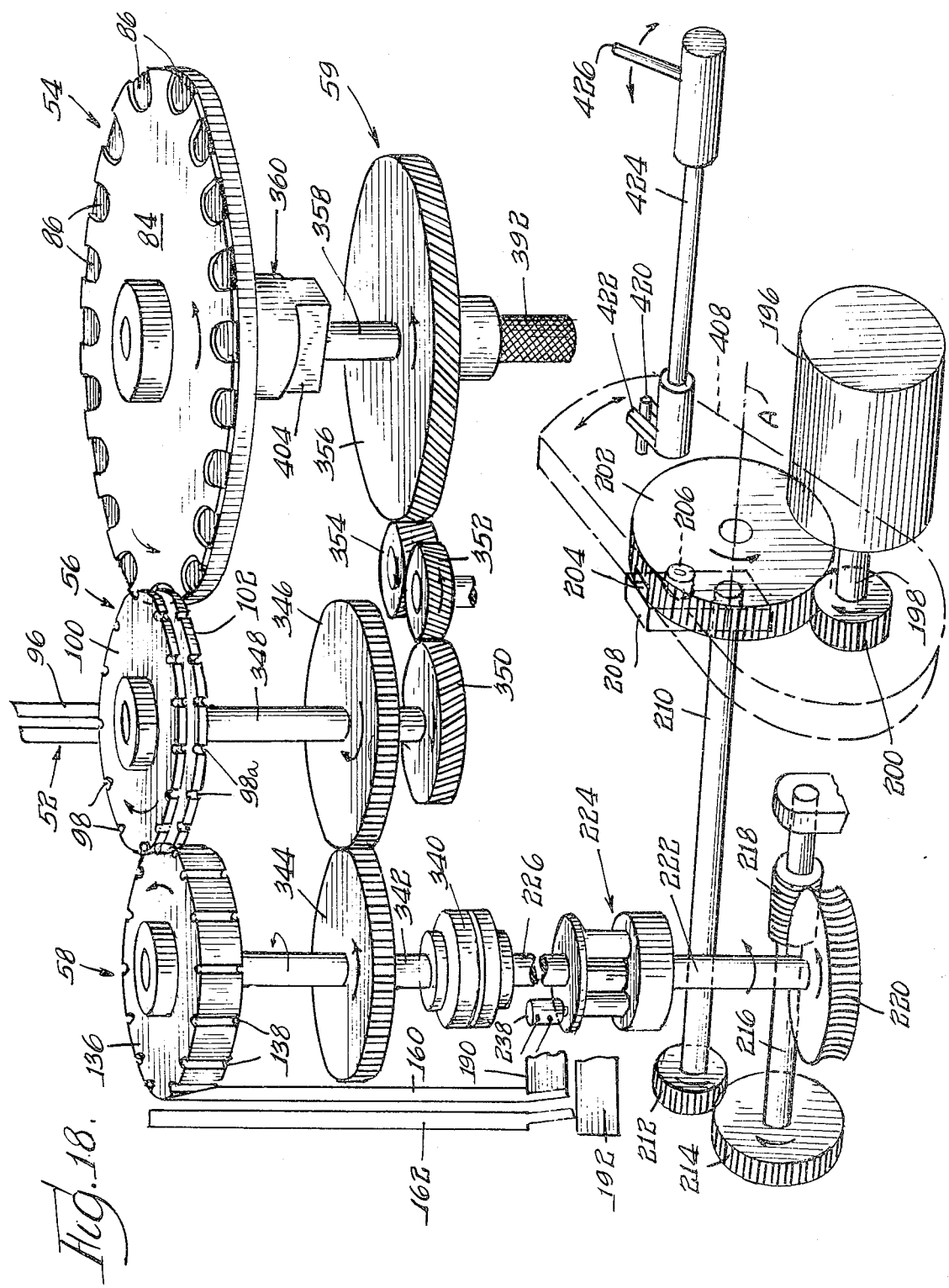
FIG. 18 is a perspective, semi-diagrammatic view of the drive mechanism for the three rotary devices for advancing the fastener and washer members.
Figure 19:
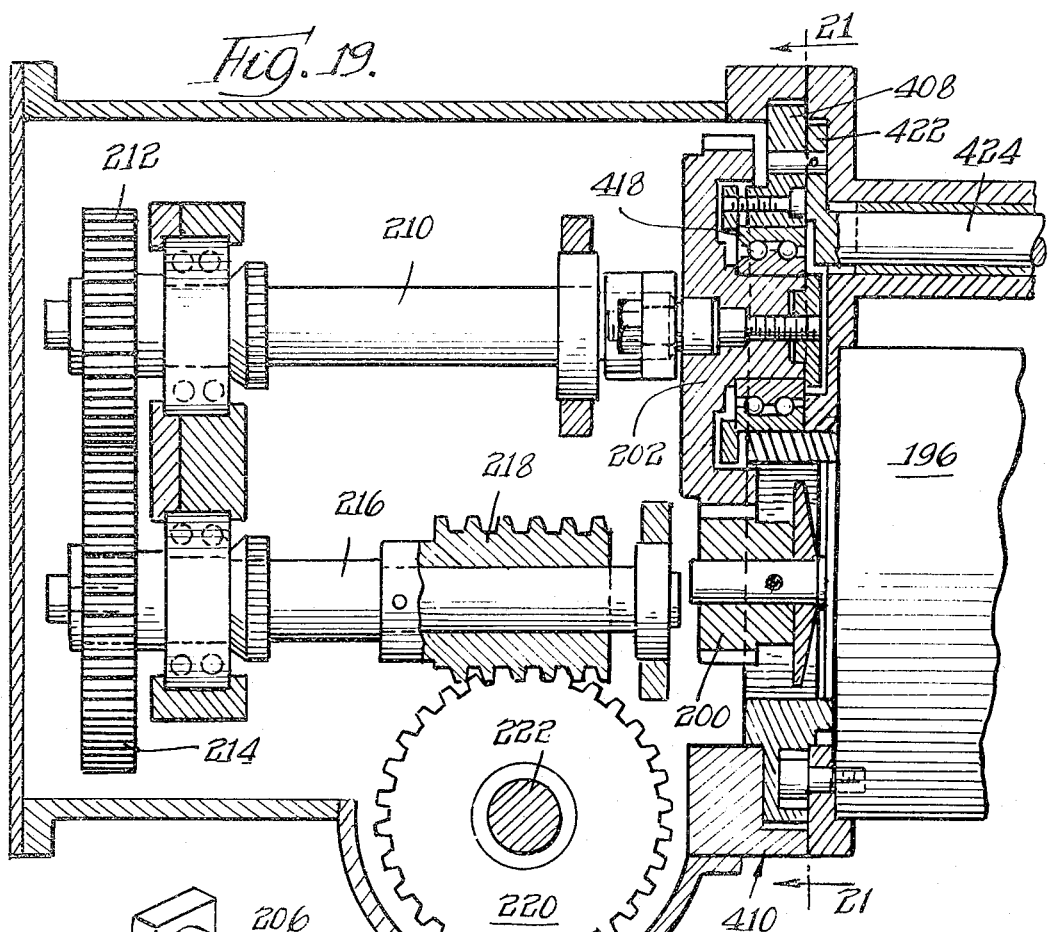
FIG. 19 is a detailed horizontal, sectional view taken substantially along the line 19—19 of FIG. 1.

Referring now to the drawings more in detail, wherein like numerals have been employed to designate similar parts throughout the various views, it will be seen that the disclosed embodiment includes a vibratory washer guide and hopper mechanism designated generally by the numeral 50, FIGS. 1, 2 and 7; a screw guide and hopper mechanism designated generally by the numeral 52, FIGS. 1, and 2; a rotary washer feeding device 54, FIGS. 1, 2, 3 and 7; a rotary screw feeding and assembling device designated generally by the numeral 56, FIGS. 1, 2 and 9; a rotary assembly feeding device designated generally by the numerals 58, FIGS. 1, 2 and 9; and a source of power and gear drive mechanism, designated generally by the numeral 59, see particularly FIGS. 17 and 18.

VIBRATORY WASHER GUIDE AND HOPPER

The vibratory washer guide and hopper is illustrated clearly in FIGS. 1, 2 and 6. A washer hopper 60, is shown by dot and dash lines FIGS. 1 and 6, and in FIG. 2, the chute portion of the hopper 60, is fragmentarily disclosed. Washer members 62, of the spring or conical type are supported as an indiscriminately arranged mass within the hopper 60, and may be directed along the chute of the hopper to be cascaded into a washer feeding channel device 64.

The washer feeding channel device comprises two main sections, a lower section 66, and an upper section 68. The lower channel section 66 is inclined upwardly from a location where washer members 62 unaccommodated by the rotary washer feeding device 54 are discharged. Conventional vibrator mechanisms 70 and 72, FIG. 6, subject the floor of the channel 66 to vibration in such a manner that the washer members work their way upwardly to the location where they are directed into the lower extremity of the channel 68. Electrically operated vibrators of conventional design cause the washer members received by the channel 68 to work their way upwardly along the inclined floor of the channel until they reach a drop off or cascading ledge 68a. It should also be understood that a conventional electrically operated vibrator 74, FIG. 1, serves to urge washer members from the hopper 60 into the upper extremity of the channel 66, when the level of the supply of washer members in the channel device 64 falls to a predetermined point. A pivoted arm 76, pivotally mounted on a bracket 78, pivotally supports a pair of washer member engaging arms, or feelers 80. When the channel 66, has a sufficient supply of washer members, the feeler arms 80 resting upon the washer members, will be elevated sufficiently to operate a switch mechanism 82 which will electrically disconnect the hopper vibrator 74. Likewise, when the feeler arms 80 reach a lowered position, indicating the need for an additional supply of washer members, the switch 82 will close and thereby cause the hopper vibrator 74 to be energized. It will thus be apparent that washer members unaccommodated by the rotary washer feeding mechanism 54 will in effect be recirculated through the channel device 64 and cascaded upon the upper surface of a rotary disc member 84 of the mechanism 54, and that an additional supply of washers is provided when required.

ROTARY WASHER FEEDING DEVICE

From the foregoing it will be understood that washer members 62 advanced along the vibrated channel sections 66 and 68 ultimately will be cascaded over the edge 68a. As the washer members 62 are cascaded in relatively large quantities on the upper surface of an upwardly inclined disc 84, of the rotarywasher feeding device 54, some of them will come to rest upon the disc with the crown side up in the position indicated at the center portion of FIG. 3. Others, however, may occupy the reverse position with the crown side down as shown at the right side of FIG. 3. The rotary feeding disc 84 is provided with a plurality of peripheral washer accommodating pockets 86.

Washer members with their crown side facing upwardly are adapted to be received by and trapped within the pockets 86, whereas washer members which are reversely positioned with the crown surface facing downwardly will not become trapped within the pockets, but will slide over the upper edge of a washer retaining rim 88, as clearly illustrated in FIGS. 3 and 5. The last mentioned washer members will be returned to the lower end of the channel section 66. To facilitate the accumulation of a sufficient supply of washer members along the lower margin of the washer feeding disc 84, a rotatably driven cylinder 90 may be employed having a relatively soft peripheral surface. An electric motor 92 imparts rotation to the roller 90, the periphery of which is positioned adjacent the upper surface of the washer feeding disc 84 and moves in opposition to the direction of travel of the disc surface. It should be clear from the foregoing that the supply of cascaded washer members is sufficient to more than accommodate the pockets 86; hence all surplus washers regardless of their oriented position upon the disc, are delivered to the lower end of the channel section 66. The above described arrangement has been found to operate at almost 100% efficiency. That is to say, properly oriented washers fill substantially all of the pockets during the operation of the machine. One of the problems heretofore experienced in the practice of prior methods of assembly, has been the inability to supply washer members at a relatively rapid rate to an assembly station. By practicing the above described cascading system of supplying washers, pockets filled with washer members may be moved along a circular path at a relatively rapid rate.

SCREW GUIDE AND HOPPER

The screw guide and hopper mechanism 52 includes a suitable hopper 94 for retaining a relatively large supply of indiscriminately arranged rotary fastener members such as screw blanks. Hoppers of this general type are well-known in the art and hence a detailed description thereof is not necessary for a clear understanding of the present invention. The device 52 also includes a guide rail or chute 96 which is designed to receive screw blanks from the hopper 94. Screw blanks are fed downwardly along the inclined guide rail 96 with the underside of the heads of the blank resting upon the upper surface of the guide rail. Screw blanks from the guide rail 96 are delivered successfully to blank accommodating notches 98 and 98a of the rotary screw blank feeding and assembly device 56.

ROTARY FEEDING AND ASSEMBLING DEVICE

As will be seen from FIG. 9, the screw blank feeding and assembly device 56 rotates in a clockwise direction and the previously mentioned disc member 84 rotates in a counterclockwise direction through the agency of driving mechanism hereinafter to be described. The device 56 includes a pair of axially spaced parallel plate members 100 and 102, see FIGS. 9–13 inclusive. Screw blanks 104 gravitate toward the lower extremity of the guide rail 96, and the lowermost blanks are successively received by the notches or recesses 98 in the rotating plate 100 and notches 98a in the plate 102. The underside of the heads of the blanks 104 rest upon the upper surface of the plate member 100.

As the lower screw blanks approach their complementary peripheral slots or recesses, a spring pressed finger 106, FIG. 30, engages the periphery of the screw blank shank and thereby guides the blank into registration with its complementary recess in the plates 100 and 102. In the event that the screw blank does not become properly registered with a notch, as indicated in FIG. 31, pressure of the screw blank shank against the lower extremity of the finger 106, causes said finger to shift upwardly against the action of a spring member 108. If the lowermost screw blank does not fall into registration with a notch, it is carried forward to the position shown in FIG. 32. In this position a second spring pressed finger 110 is shifted to the position shown, thereby permitting the lowermost screw blank to be ejected. The detailed sections shown in FIGS. 33 and 34, afford a side view of the fingers 106 and 110 respectively. The forward extremity of each of said fingers has a vertical length sufficient to coact with screw blanks of varying lengths. It will be seen from FIG. 34 that the finger 110 is continuously urged forward by a coil spring 112. As the screw blanks 104 move in a circular path from the discharge extremity of the guide rail 96 toward the point of tangency of the plates 100–102, with the washer feeding disc 84, the lower extremities of the screw blanks engage an upwardly inclined surface 114 of a cam member designated generally by the numeral 116, FIGS. 11, 13 and 14. From the upwardly inclined cam surface 114, the lower extremities of the screw blanks ultimately engage a horizontally disposed cam surface 118. The position of the disc pockets and the synchronization of movement thereof, with respect to the rotating plate members 100 and 102, is such that washer members 62 are successively brought into alignment with the lower extremities of complementary screw blanks 104. To assure positive telescopic association of the screw blanks 104 with a companion washer member 62, a leaf spring 120 is employed. One extremity of the leaf spring 120 is fixed to a frame member of post 122 and the free extremity thereof is positioned to engage the outer surfaces of the screw blank heads to assure partial telescopic association of screw blanks and washer members as shown in FIG. 11.

As the partially assembled screw blanks and washer members move away from the free extremity of the leaf spring 120, the washer members are supported upon the upper surface of a pair of arcuate plate members 126 and 128, FIGS. 11 and 13. These arcuate plate members are spaced to provide an arcuate groove or guideway 130 to accommodate the extremity of each screw blank extending below the washer member associated therewith. To assure engagement of the clamping side of each screw blank with the upper surface of the plate member 100, as these blanks together with washer members partially assembled therewith continue to move long a circular path, the free extremity of a second leaf spring 132, engages the outer surface of the screw blank heads, FIGS. 9, 10 and 11. The opposite extremity of the leaf spring 132 is suitably fixed to a frame post 134.

The partially assembled screw blanks and washer members continue to move in a circular path, the lower extremities of the screw blanks being guided in the arcuate slot 130 to the point of tangency of the plate 100 with the periphery of a rotatable drum 136 of the feeding device 58. Recesses or notches 138 are provided along the periphery of the drum 136, and as the partially assembled screw blank and washer members reach the end of the guideway 130, as seen in FIGS. 9 and 13, a third leaf spring 140 presses against the outer extremities of successive screw blanks, thereby forcing the blanks into complete telescopic association with complementary washer members. The peripheral recesses 138 cause the completely assembled screw blanks to move along a circular path. An arcuate guide member 142, FIG. 9, positioned closely adjacent the periphery of the drum 136, prevents lateral dislodgement of the screw blanks from the drum. At approximately 180° from the point of tangency of the drum 136 and the plate 100, each telescopically assembled screw blank and washer member moves into association with a detecting device designated generally by the numeral 144, illustrated somewhat in detail in FIGS. 35, 36 and 41. The device 144 serves to select and direct screw blank members having washer members associated therewith. Before reaching the selecting device 144, the telescopically assembled rotary fastener and washer members pass beneath an arm 145. If a fastener member or screw blank is properly positioned on the drum 136, it will just clear the under surface of the arm. Should a screw blank not clear the arm 145, the operation of the machine will be arrested due to automatic slippage or disengagement of a clutch mechanism later to be described.

SCREW BLANK SELECTING AND DIRECTING DEVICE

The device 144 includes a tiltable arm structure 146, which is pivotally mounted at the upper extremity of a yoke member 148. The lower extremity of the yoke member 148 is pivotally mounted at 150 upon a fixed bracket member 152. The arm structure 146 is continually urged in a clockwise direction as viewed in FIG. 41, by a coil spring 154 which extends between an extremity of the arm structure and a horizontal fixed bracket member 156. The opposite extremity of the arm structure 146 is traversed by a screw blank selecting finger or bar 158, and the above-mentioned spring 154 serves to urge the bar 158 downwardly. With the arm structure 146 occupying the solid line position shown in FIGS. 35 and 41, a screw blank 104 properly seated upon the upper crowned surface of a complementary washer member 62, will be guided by the bar 158 so as to deflect the blank from the circular path of the drum periphery into an inclined slot 160 of a guiderail 162. In this position the washer member 62 will rest upon the upper surface of the guiderail as clearly shown in FIGS. 37 and 41. A leaf spring 164 associated with the guidebar 158 urges the screw blanks in a downward direction.

Should a washerless screw blank be present, the upper surface of the blank will clear the under surface of the guidebar 158 thereby causing the blank to continue to move in a circular path by the drum 136. The vertical position of the bar 158 may be controlled by an adjusting screw 166, the setting of which is maintained by a coil spring 168. A spring 170 urges the yoke 148 against the extremity of an adjusting screw 172, the position of adjustment of said screw being maintained by a coil spring 174. Thus the screw 172 serves to adjust the horizontal positioning of the guidebar 158. Such adjustment is provided to accommodate the screw blank heads of different diameters. The above-mentioned screw 166 serves to vertically adjust the position of the guidebar 158 to accommodate screw blank heads of varying axial dimension.

WASHERLESS SCREW BLANK GATE DEVICE

As previously stated, washerless screw blanks clear the lower surface of the guidebar 158 and continue to move along the circular path of the drum periphery. A cam member or gate 176 has a surface 178 which guides washerless screw blanks to an area where said blanks will be released by gravity from the drum periphery, see FIG. 40.

The gate or cam member 176 is yieldably urged toward the periphery of the drum 136 by suitable springs 180 and 182, FIGS. 35 and 37. Should a washerless screw blank tend to become slightly dislodged from its complementary notch 38, as illustrated in FIG. 39, the springs 180 and 182 will permit the gate to yield and thereby assure continued movement of the washerless screw blank along the circular path of the drum periphery. An arched spring arm 183, FIG. 9, may also be employed to assure rejection of washerless screw blanks from the notches 138.

DELIVERY OF THREAD ROLLER

From the foregoing it will be apparent that the combined screw blanks and washer members are selected and guided by the bar 158 into the downwardly inclined guideway 160 of the guiderail 162. At the lower extremity of the guideway 160, FIG. 43, suitable ducts 184 and 186 direct air under pressure against the shanks of the screw blanks so as to assure proper delivery thereof to conventional thread rolling dies 190 and 192. Swaging or rolling thread convolutions on the shanks of the screw blanks 104 increases the diameter sufficiently to secure the washer members against dislodgement. In FIG. 44, a fastener unit designated generally by the numeral 194, is illustrative of one form of preassembled screw and washer members which may be produced by practicing the above described novel method of assembly.

DRIVE MECHANISM

The drive mechanism 59 for imparting rotation to the rotary feed devices 54, 56 and 58 may readily be understood from the semi-diagrammatic illustration in FIG. 18. This mechanism includes a suitable source of power supply such as an electric motor 196 coupled through a shaft 198 with a gear member 200. The gear 200 drives a larger gear 202 which is provided on one side thereof with a transverse slot or recess 204. The recess 204 is actually formed in an axial extension of the gear body as clearly illustrated in FIG. 20. The slot 204 accommodates a roller 206 mounted at the extremity of a crank arm 208 which is fixed to a shaft 210. When the axis of the shaft 210 is coincident with the axis of the gear 202, as illustrated by the dot and dash line A, FIGS. 18 and 20, the shaft 210 will rotate at a constant or uniform speed during each revolution of the roller 206 about said axis. If the axis of the gear 202, is laterally displaced with respect to the axis of the shaft 210, said shaft will experience a variation in speed of rotation during each cycle of revolution of the roller 206 about the axis A. The purpose for such variation in speed of rotation, and the manner in which it is accomplished, will be described later. At this point in the description it will suffice to explain that the shaft 210 rotates a gear 212 meshing with gear 214 mounted on a shaft 216. The shaft 216 rotates a worm meshing with a worm gear 220 mounted at the lower extremity of a shaft 222. The shaft 222 is coupled with a clutch device designated generally by the numeral 224 which in turn is connected with a shaft 226.

The details of this clutch device or mechanism 224 are illustrated in FIGS. 24–26, inclusive. The clutch 224 includes a lower drive section 228 which is adapted to be drivingly coupled with an upper clutch section 230 by three uniformly spaced spring pressed plungers 232. FIG. 24 discloses the lower extremity of each plunger 232 interlocked with a complementary aperture 234 beveled along its upper margin to accommodate the beveled extremity of the plunger. Coil springs 236 serve to maintain this interlocked relationship. Any tendency for the various driven elements of the above described machine to experience overload conditions will effect the immediate disengagement of the clutch. A suitable electrical control switch device 238, FIGS. 24 and 25 may be actuated so as to disconnect the electrical circuitry of the machine when the clutch occupies the disengaged position shown in FIG. 25.

The shaft 226 of the drive mechanism 59 is connected through a suitable coupling 340 with a shaft 342 which drives a gear 344. The upper extremity of the shaft 342 is connected with the previously described drum 136. The gear 344 drives a companion gear 346 secured to a shaft 348, and the upper extremity 348 is connected with the rotary feeding mechanism 56. The lower extremity of the shaft 348 carries a helical gear 350 meshing with a helical gear 352 which drives a companion gear 354. The gear 354 meshes with a larger helical gear 356 mounted upon a shaft 358. The shaft 358 is connected through a novel coupling device 360 to the rotary disc member 84, FIG. 15. The disc 84 rotates relative to an underlying frame structure 362 and the upper portions of the drive shafts 342, 348 and 358, are mounted within suitable anti-friction bearings 364, 366 and 368 respectively.

MICROMETER ADJUSTMENT DEVICES

Experience has dictated the necessity of providing for lateral and circumferential adjustments of the rotary washer feeding disc 84. For example, it is extremely important that the tangential relationship between the pitch circle of the disc 84 and the pitch circles of the rotary plate members 100 and 102 be maintained. The pitch circle of the disc 84 is that circle which is coincident with the centers of the washer members 62 in the disc pockets 86, and the pitch circle of the plates 100 and 102 are those circles which are coincident with the axes of the screw blanks supported in the peripheral notches 98 and 98a. In the event that such an adjustment is necessary, a knurled internally threaded knob 370 mounted on the outer extremity of a rod 372 is rotated, FIGS. 15, 17 and 42. The left extremity of the rod 372 as viewed in FIGS. 15 and 42, is connected by a pivot 374 to a fixed plate member 376. This plate 376 forms the bottom section of a frame structure 378 which supports the previously mentioned anti-friction bearings 364 and 366. Bolts 380, FIGS. 8 and 13, secure the plate 376 to the upper side of frame blocks 382 forming a part of the bed of the machine. A section of the machine frame 362 extending to the left as viewed in FIG. 15, is supported by four bolts with 384 FIGS. 16 and 17; which extend through complementary arcuate slots 386 in the fixed plate 376. The upper extremities of these bolts 384 accommodate nut members 386. A pin 388 provides a pivot between the frame structure 362 and the undersurface of the fixed plate 376. The rod 372 in the vicinity of the knurled knob 370 swively coupled with a post 390 fixed to and extending upwardly from the frame structure 362. Thus, as rotation is imparted to the knurled knob 370, the entire frame structure 362 will be shifted about the pivot 388.

In FIG. 42 the shaft 358, the axis of which is coincident with the axis of the disc member 84, is shown in the solid line position and in a shifted dot and dash line position. The arc through which this axis shifts is indicated by the letter B, and the radius of the arc is indicated by the letter C. The presence of the gears 352 and 354 make it possible to effect this arcuate shifting of the machine frame without disturbing the meshed relationship of the driving gears. A dot and dash circle indicated by the letter D in FIG. 42, represents the pitch circle of the washer disc 84 when the drive shaft 358 occupies the solid line position and the circle indicated by the letter E represents the pitch circle when the drive shaft 358 has been shifted to the dotted line position. The above described structure makes it possible to obtain very accurate lateral adjustment of the disc 84.

To rotatably adjust the washer feeding disc 84 to assure absolute alignment of the axes of the screw blanks and washers at the point of initial telescopic assembly, it is only necessary to apply rotation to a knurled knob 392, FIGS. 8, 15 and 27. Such rotation will cause a plate member 394 to shift axially and this plate is connected with an upper plate 396 supporting the underside of an anti-friction bearing 398 positioned at the lower extremity of a sleeve 400.

As the gear 356 shifts vertically it will also experience some degree of rotation as a result of the interaction of the helical teeth thereof with the helical teeth of the companion gear 354. A coil spring 402 is biased against the upper side of the gear 356. Rotation of the gear 356 and the sleeve 400 causes the same degree of rotation to be imparted to the shaft 358 coupled to the sleeve 400 through the agency of a key 404 positioned within a cross slot 406 in the sleeve. Thus the rotation experienced by the gear 356 during the aforesaid vertical shifting thereof is imparted to the washer feed disc 84.

VARIABLE SPEED ADJUSTMENT DEVICE

Figure 20:
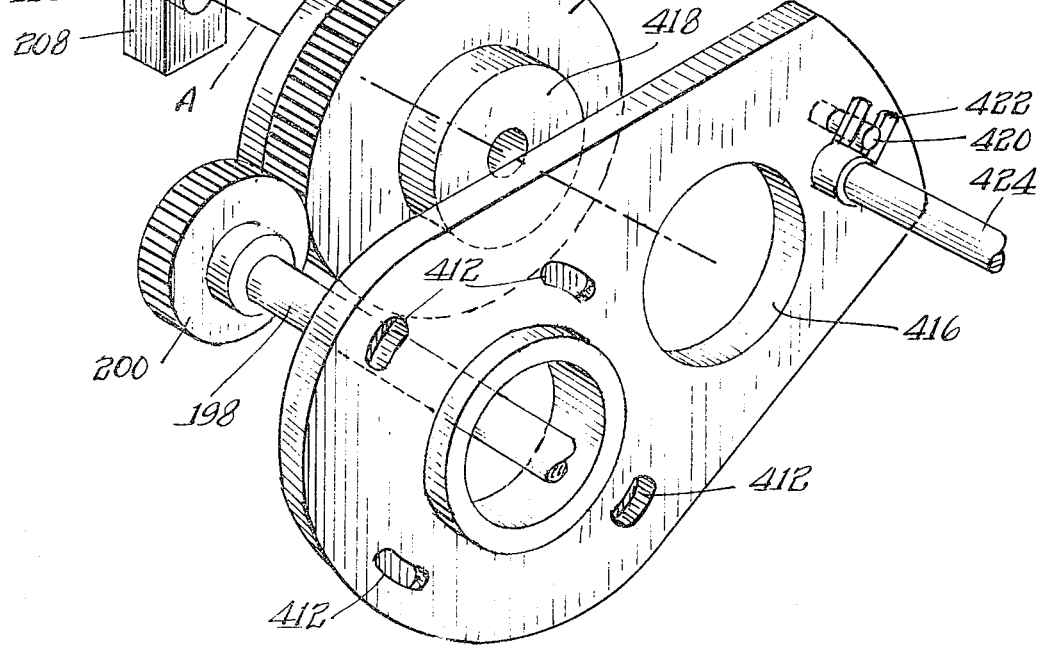
FIG. 20 is an exploded, perspective view of the drive assembly.
Figure 21:
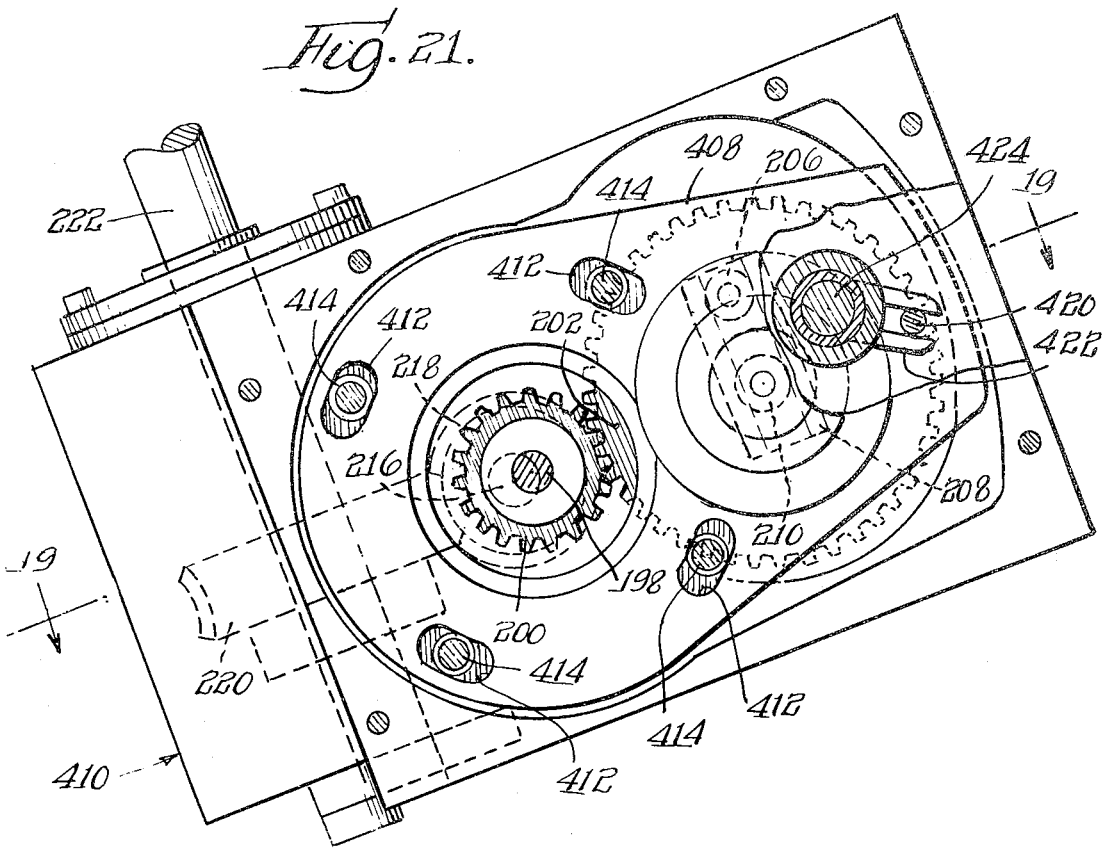
FIG. 21 is a vertical sectional view taken substantially along the line 21—21 of FIG. 19.

In the description thus far presented, it has been assumed that the axis designated by the letter A in FIG. 20, is coincident with the axis of the shaft 210 and the axis of the gear 202. Under such circumstances, as the gear 202 rotates it will impart a uniform rate of rotation to the shaft 210. It has been found practical to provide an adjustment whereby variation in speed of rotation of the shaft 210 will occur during each cycle of revolution of the crank arm 208. For example, as each of the disc pockets 86 move into alignment with a complementary pair of notches 98–98a, it is advantageous in certain instances to retard the speed of travel of said complementary disc pockets and notches. In this manner, the telescopic association of a screw blank and washer member is assured. Furthermore, the aforesaid variation in rate of movement during each cycle of revolution of the crank arm 208 imparts a desirable vibration, or pulsation, to all of the rotary feeding devices 54, 56 and 58. It has been found that such vibration under certain circumstances, expedites the assembly function of these devices.

If the axis of the gear 202 is shifted laterally, or out of alignment with respect to the axis of the shaft 210, the roller 206, and consequently the shaft 210 will experience variation in speed of movement during each cycle of revolution of the roller about the axis of the shaft 210. This is accomplished through the agency of a tiltable plate member 408 mounted within a housing 410 which also encloses gears 200 and 202. Four accurate slots 412 loosely accommodates the heads of bolts 414 which secure the electric motor 196 to the housing 410. An aperture 416 in the plate 408, accommodates anti-friction bearing means 418 which supports the gear member 202. A pin 420 extending from the plate 408 is adapted to be laterally shifted within predetermined limits by a forked arm 422 carried by a rod 424 suitably mounted within the housing structure 410. An arm 426 extending laterally from the outer extremity of the rod 424 serves to facilitate manual rotation thereof.

Figures 22, 23:
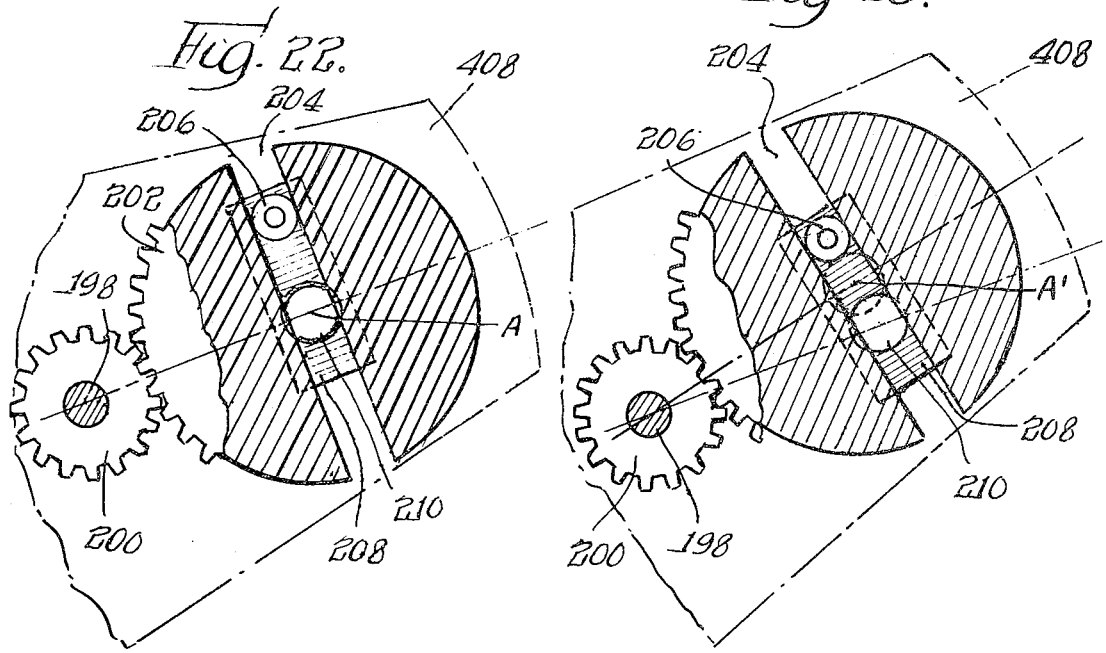
FIGS. 22 and 23 are end views of the crank arm arrangement illustrated in FIG. 20, to show the manner in which the variation in speed of movement of the rotary feeding devices during each period of advancement thereof is accomplished.

The extent to which the plate 408 is tilted in response to rotation of the rod 424, will determine the nature of the variation in rate of speed experienced by the rotary feeding devices 54, 56 and 58 during each cycle of revolution of the follower roller 206 about the axis of the drive shaft 210. As will be seen from FIGS. 22 and 23, tilting the plate 408 causes the gear 202 to shift about the axis of the gear 200. In FIG. 22, shaft 210 is illustrated by the cross-hatched circle and the axis thereof as indicated by the letter A is coincident with the axis of the gear 202. In FIG. 23 the plate 408 has been shifted so as to cause the axis of the gear 202 indicated by the letter A' to be shifted arcuately about the axis of the gear 200.

To accommodate washer members of a different size it is only necessary to replace the disc 84 with a disc having peripheral notches conforming with the change in washer member diameter. Regardless of the size of the washer members, the diameter of the pitch circles of the discs remain constant. This is best illustrated in FIG. 42, wherein the dot-and-dash circle designated by the letter E remains the same for the differing sizes of washer members illustrated. Likewise the rotary plate members 100 and 102 may be changed to accommodate screw shanks of different sizes, but the pitch circle remains constant. In instances where it is deemed necessary, a spring wire member 428 adjacent the upper margin of the washer feeding disc 84, FIGS. 2 and 6, may be employed to counteract any tendency for the washer members in that vicinity to become dislodged. Also an electrically operated vibrator device 430, FIG. 6, may be employed beneath the disc member 84 for imparting vibrations thereto. Vibrators beneath the channel 68 are designated by the numerals 432 and 434. These vibrators may be functionally similar to the previously mentioned vibrator devices 70 and 72.

STATEMENT OF OPERATION

From the foregoing it will be understood that the present invention contemplates novel and very practical methods and apparatus whereby rotary fastener members and washer members may be efficiently and speedily assembled. A supply of washer members from an indiscriminately arranged mass thereof in the hopper 60 may be discharged into association with the upwardly inclined channels or tracks 66 and 68. To facilitate this delivery a suitable device 74 may be employed to impart high frequency vibrations to the hopper. Conventional devices are located beneath the channels 66 and 68 to vibrate the channels in such a manner as to actually effect the upward travel of washer members in said channels. It has been found practical for example to employ commercially available vibrators marketed under the name Syntron. Such vibrators operate at sixty cycles and the channels 66 and 68 may be inclined at an angle of about 6°. Washer members from the discharge extremity of the channel 68 are cascaded and thereby flooded upon the rotating disc member 84 and properly oriented washer members become lodged within complementary peripheral pockets 86. Unaccommodated washers from the disc 84 are delivered to the lower extremity of the channel 66 and are recirculated by vibration to the cascading location. The feelers 80 associated with the channel 66 effect the actuation of the vibrator 74 when the level of the washers within the channel 66 reach a predetermined low point. The motor driven roller 90 functions to prevent washer members on the surface of the disc from migrating toward the upper portion thereof.

As the axis of each washer member approaches alignment with a screw blank fed from the guide rail 96 along the periphery of the rotary members 100 and 102, a cam surface 118 elevates the screw blanks until they become aligned with complementary washer members at which time the leaf spring 120 urges the screw blanks into partial telescopic assembly with the washers. If desired, the speed of movement of the approaching screw blanks and washer members may be retarded to facilitate proper telescopic assembly of these members. The partially assembled screw blanks and washer members move along a circular path to a point of approximate tangency with the drum 136 of the rotary feeding device 58. The leaf spring 140 urges the screw blanks into complete telescopic assembly with a companion washer member and directs these assembled members into one of the peripheral notches 138. In the event that a screw blank is not completely inserted within its companion washer, the head of the screw blank will strike the stop 145 thereby disengaging clutch 224 and electrically deenergizing the circuitry of the machine.

As combined screw blank and washer members continue to advance they become associated with the selecting and directing device 144. Properly assembled screw blanks and washers are directed by this device to the guiderail 162 leading to the thread roller dies 190 and 192. A gate member 176 prevents washerless screw blanks from entering the guiderail and such screw blanks are ultimately discharged from the rotary feeding device 58. Extremely accurate and fine lateral and rotary adjustment of the washer feeding plate 84 may be made in accordance with the teachings of the present invention. Such adjustments are important factors in maintaining the proper tangential relationship of the pitch circles of the rotary washer and screw blank feeding devices. Rotation of the knob 392 affects a very delicate rotary adjustment of the washer feeding disc 84 and actuation of the knob 370 serves accurately to laterally adjust the washer feeding disc with respect to the rotary fastener feeding device 56. Also, manipulation of the rod 424 will control the variation in rate of speed experienced by the screw blanks and washer members as they approach positions of alignment with each other.

By employing the above described novel method and apparatus for telescopically associating rotary fastener members with washer members, the rate of producing fastener units has been greatly accelerated. Heretofore, such fastener units have been produced at a maximum rate of approximately 225 units per minute. The present method and apparatus enables the rate of production of fastener units to exceed 600 units per minute.

I claim:

1. The method of assembling rotary fastener members with washer members which comprises feeding a mass of washer members along a given path, cascading washer members from said path downwardly into association with a plurality of washer accommodating pockets moving along an inclined circular path, removing unaccommodated washer members from said circular path, feeding rotary fastener members having a washer receiving shank along a different path into juxtaposition and alignment with washer members from said circular path, telescopically assembling said members, swaging said rotary fastener members to secure washer members against dislodgement therefrom and recirculating unaccommodated washer members along a predetermined path to said first mentioned path.

2. The method of assembling rotary fastener members with washer members as set forth in claim 1, including the step of recirculating washer members unaccommodated by said pockets along an inclined path to the first mentioned path.

3. The method of assembling rotary fastener members with washer members as set forth in claim 1, including the step of vibrating said washer members during the recirculation thereof so as to cause said washers to advance forwardly and upwardly along an inclined path to the point of cascading.

4. The method of assembling rotary fastener members with washer members as set forth in claim 1, including the step of successively advancing said rotary fastener members into juxtaposition and alignment with washer members cascaded from an indiscriminately arranged mass thereof.

5. The method of assembling rotary fastener members with washer members as set forth in claim 4, including the step of forcing said fastener members axially to assure complete telescopic assembly thereof with complementary washer members.

6. The method of assembling rotary fastener members with washer members as set forth in claim 1, including the step of cascading the washer members in the form of an indiscriminately arranged mass into association with said washer accommodating pockets, selecting only those washer members occupying a predetermined position of orientation into registration with said pockets, and then recirculating the unaccommodated washer members along said predetermined path to the point of cascading.

7. The method of assembling rotary fastener members with washer members as set forth in claim 1, including the step of advancing the telescopically assembled members along a second circular path, before swaging the rotary fastener members.

8. The method of assembling rotary fastener members with washer members as set forth in claim 7, including the step of diverting completely assembled fastener and washer members from said second circular path into a third circular path before swaging the fastener members.

9. The method of assembling rotary fastener members with washer members as set forth in claim 7, including the step of elevating fastener members during movement thereof into alignment with complementary washer members, and then lowering said fastener members into telescopic assembly with complementary washers before diverting the assembled members from said second circular path.

10. The method of assembling rotary fastener members with washer members as set forth in claim 9, including the step of applying pressure axially of said telescopically associated members to assure complete telescopic assembly thereof after diverting the assembled members from said second circular path.

11. The method of assembling rotary fastener members with washer members as set forth in claim 1, including the step of selecting unaccommodated washer members from the lower area of said inclined circular path and recirculating such washers to the first mentioned path.

12. The method of assembling rotary fastener members with washer members as set forth in claim 1, which includes feeding rotary fastener members along a second circular path into successive juxtaposition and alignment with complementary washer members in the first mentioned circular path, subjecting the aligned fastener members and washer members to partial telescopic assembly and moving said aligned and partially assembled fastener members and washer members along the second circular path.

* * * * *